(12) United States Patent
Mack et al.

(10) Patent No.: US 9,897,886 B2
(45) Date of Patent: Feb. 20, 2018

(54) LENS FOR DISPLAYING A VIRTUAL IMAGE

(71) Applicant: LAFORGE Optical, Inc., Venice, CA (US)

(72) Inventors: Corey Mack, Venice, CA (US); William Kokonaski, Gig Harbor, WA (US)

(73) Assignee: LAFORGE Optical, Inc., Los Angeles, CA (US)

( * ) Notice: Subject to any disclaimer, the term of this patent is extended or adjusted under 35 U.S.C. 154(b) by 0 days.

(21) Appl. No.: 15/040,444

(22) Filed: Feb. 10, 2016

(65) Prior Publication Data

US 2016/0231577 A1     Aug. 11, 2016

Related U.S. Application Data

(60) Provisional application No. 62/114,335, filed on Feb. 10, 2015, provisional application No. 62/114,350, (Continued)

(51) Int. Cl.
   *G02F 1/153*    (2006.01)
   *G02B 3/00*    (2006.01)
   (Continued)

(52) U.S. Cl.
   CPC .......... *G02F 1/15* (2013.01); *G02B 27/0172* (2013.01); *G02B 2027/0127* (2013.01); *G02B 2027/0178* (2013.01)

(58) Field of Classification Search
   CPC . G02B 3/00; G02B 21/14; G02B 7/10; G02B 25/002; G02B 7/02; G02B 7/04;
   (Continued)

(56) References Cited

U.S. PATENT DOCUMENTS

D901,575     10/1908  Wilhelm
1,282,877 A  10/1918  Laars
         (Continued)

FOREIGN PATENT DOCUMENTS

WO    2015/158828    10/2015
WO    2015/158829    10/2015
            (Continued)

OTHER PUBLICATIONS

PCT International Search Report issued in International Application No. PCT/US2015/013951 dated Jul. 2, 2015.
(Continued)

*Primary Examiner* — Dawayne A Pinkney
(74) *Attorney, Agent, or Firm* — Greenberg Traurig, LLP; Chinh H. Pham; Todd C. Basile

(57) ABSTRACT

A lens for projecting a virtual image comprising first and second body sections coupled along first and second surfaces to form an internal interface within the lens, and a reflective coating on at least a portion of either the first surface or the second surface configured to redirect light projected into the second body section toward an eye of a wearer. Another lens comprising first and second body sections having different indices of refraction, and an interface configured to redirect light toward an eye of a wearer for display as a virtual image. A method for manufacturing a lens comprising providing a first body section, casting on a first surface of the first body section a material for forming a second body section, and curing the material to form the second body section and bond it to the first body section to form a unitary lens.

18 Claims, 22 Drawing Sheets

Related U.S. Application Data filed on Feb. 10, 2015, provisional application No. 62/114,362, filed on Feb. 10, 2015, provisional application No. 62/121,903, filed on Feb. 27, 2015, provisional application No. 62/130,729, filed on Mar. 10, 2015.

(51) Int. Cl.

| | | |
|---|---|---|
| *G02B 7/02* | (2006.01) | |
| *F21V 17/00* | (2006.01) | |
| *G03B 21/14* | (2006.01) | |
| *G03B 17/00* | (2006.01) | |
| *H04N 5/225* | (2006.01) | |
| *G02F 1/15* | (2006.01) | |
| *G02B 27/01* | (2006.01) | |

(58) Field of Classification Search
CPC .. G02B 7/08; G02B 7/102; F21V 9/08; G03B 17/14; G02F 1/1523; H04N 5/2254; H04N 5/2251; H04N 5/2253
USPC ........ 359/275, 811–830, 642, 703–704, 694; 362/455; 353/100; 396/529–530; 348/335, 340, 373–374
See application file for complete search history.

(56) References Cited

U.S. PATENT DOCUMENTS

| | | | |
|---|---|---|---|
| 1,340,021 | A | 5/1920 | Cross |
| 1,554,933 | A | 9/1925 | Wells |
| 5,162,949 | A | 11/1992 | Kubota |
| 6,091,546 | A | 7/2000 | Spitzer |
| 7,158,095 | B2 | 1/2007 | Jenson et al. |
| 7,370,963 | B2 | 5/2008 | Cano et al. |
| 7,404,636 | B2 | 7/2008 | Blum et al. |
| 7,808,707 | B2 | 10/2010 | Cano et al. |
| 7,839,576 | B2 | 11/2010 | Archambeau et al. |
| 7,878,649 | B2 | 2/2011 | Archambeau et al. |
| 7,926,940 | B2 | 4/2011 | Blum et al. |
| 8,379,288 | B2 | 2/2013 | Duluard et al. |
| 8,482,839 | B2 | 7/2013 | Zaghib et al. |
| 8,542,426 | B2 | 9/2013 | Archambeau et al. |
| 8,551,561 | B2 | 10/2013 | Duluard et al. |
| 8,628,634 | B2 | 1/2014 | Marty et al. |
| 8,730,156 | B2 | 5/2014 | Weising et al. |
| 8,736,944 | B2 | 5/2014 | Biver et al. |
| 8,736,946 | B2 | 5/2014 | Archambeau et al. |
| 8,767,305 | B2 | 7/2014 | Spitzer et al. |
| 8,801,177 | B2 | 8/2014 | Archambeau et al. |
| 9,019,603 | B2 | 4/2015 | Cheng |
| 9,213,178 | B1 | 12/2015 | Giri et al. |
| 9,229,248 | B2 | 1/2016 | Kokonaski et al. |
| 2008/0273246 | A1* | 11/2008 | Moliton ............... G02B 6/10 359/633 |
| 2009/0195749 | A1 | 8/2009 | Blum et al. |
| 2011/0216060 | A1 | 9/2011 | Weising et al. |
| 2013/0069260 | A1* | 3/2013 | Buchon ............... B29C 70/68 264/1.7 |
| 2013/0250410 | A1 | 9/2013 | Cheng |
| 2015/0219899 | A1 | 8/2015 | Mack et al. |

FOREIGN PATENT DOCUMENTS

| | | |
|---|---|---|
| WO | 2015/158830 | 10/2015 |
| WO | 2015/158831 | 10/2015 |
| WO | 2015/158833 | 10/2015 |
| WO | 2015/158834 | 10/2015 |

OTHER PUBLICATIONS

PCT International Search Report issued in International Application No. PCT/US2016/017336 dated Jul. 7, 2016.

* cited by examiner

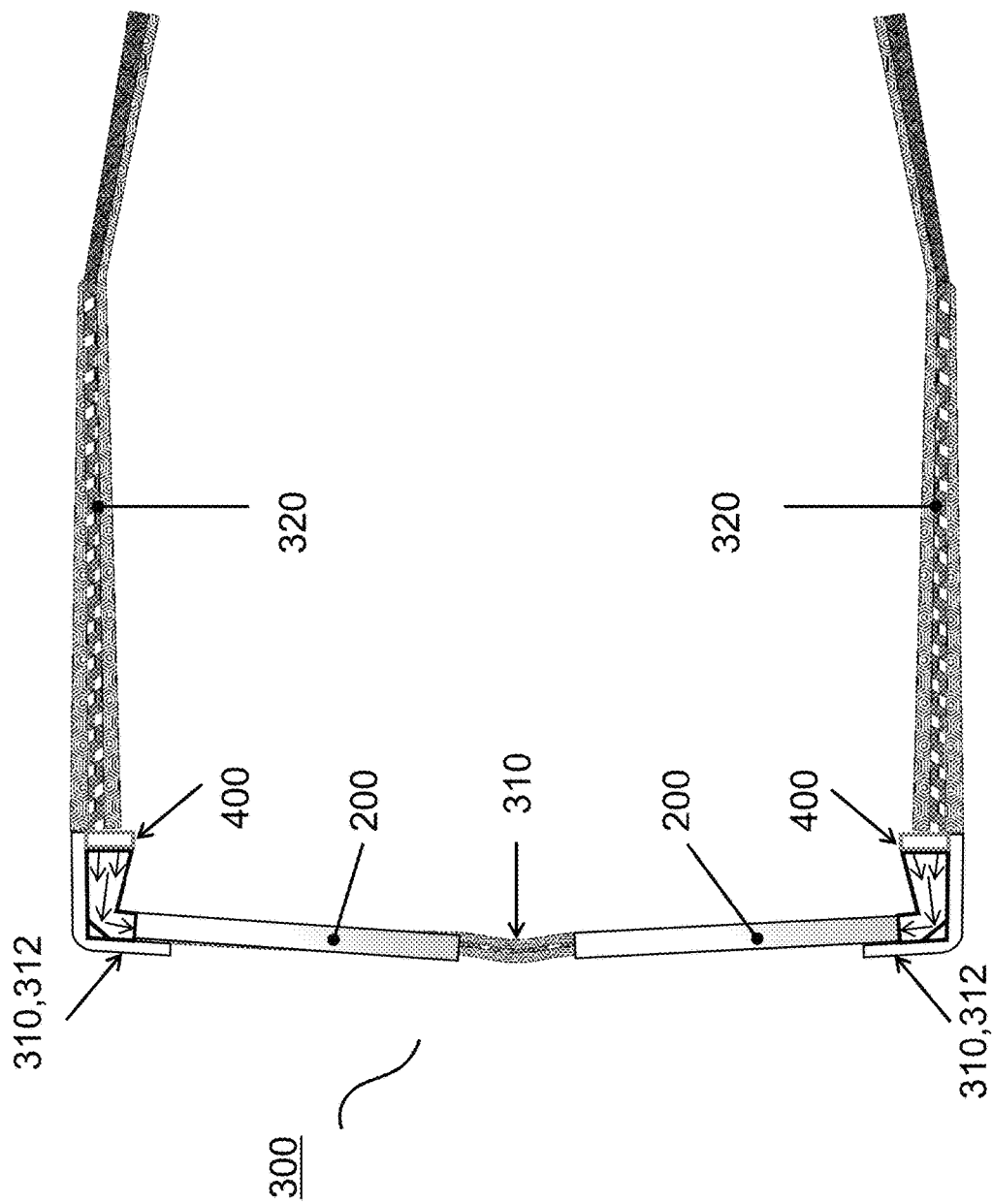

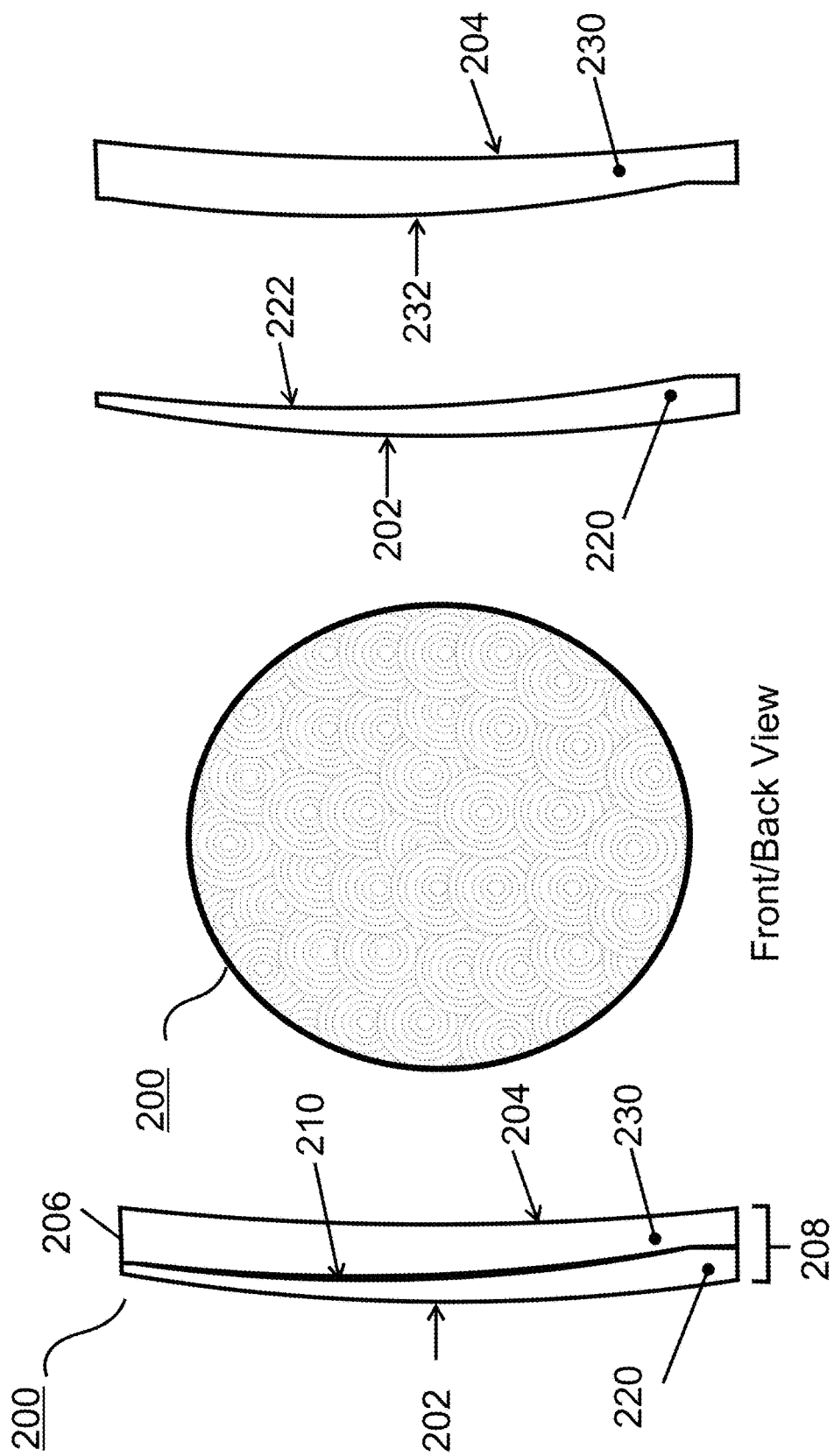

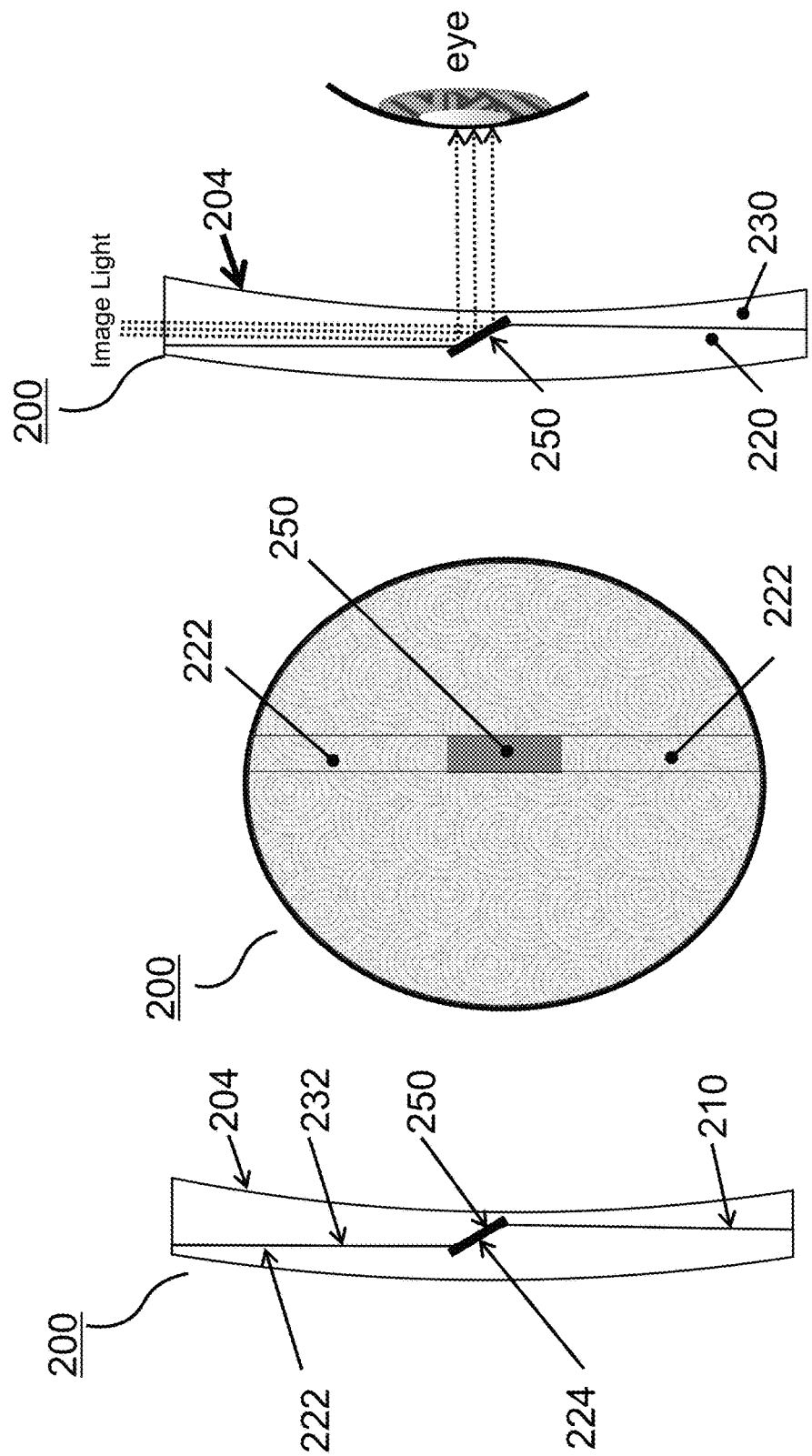

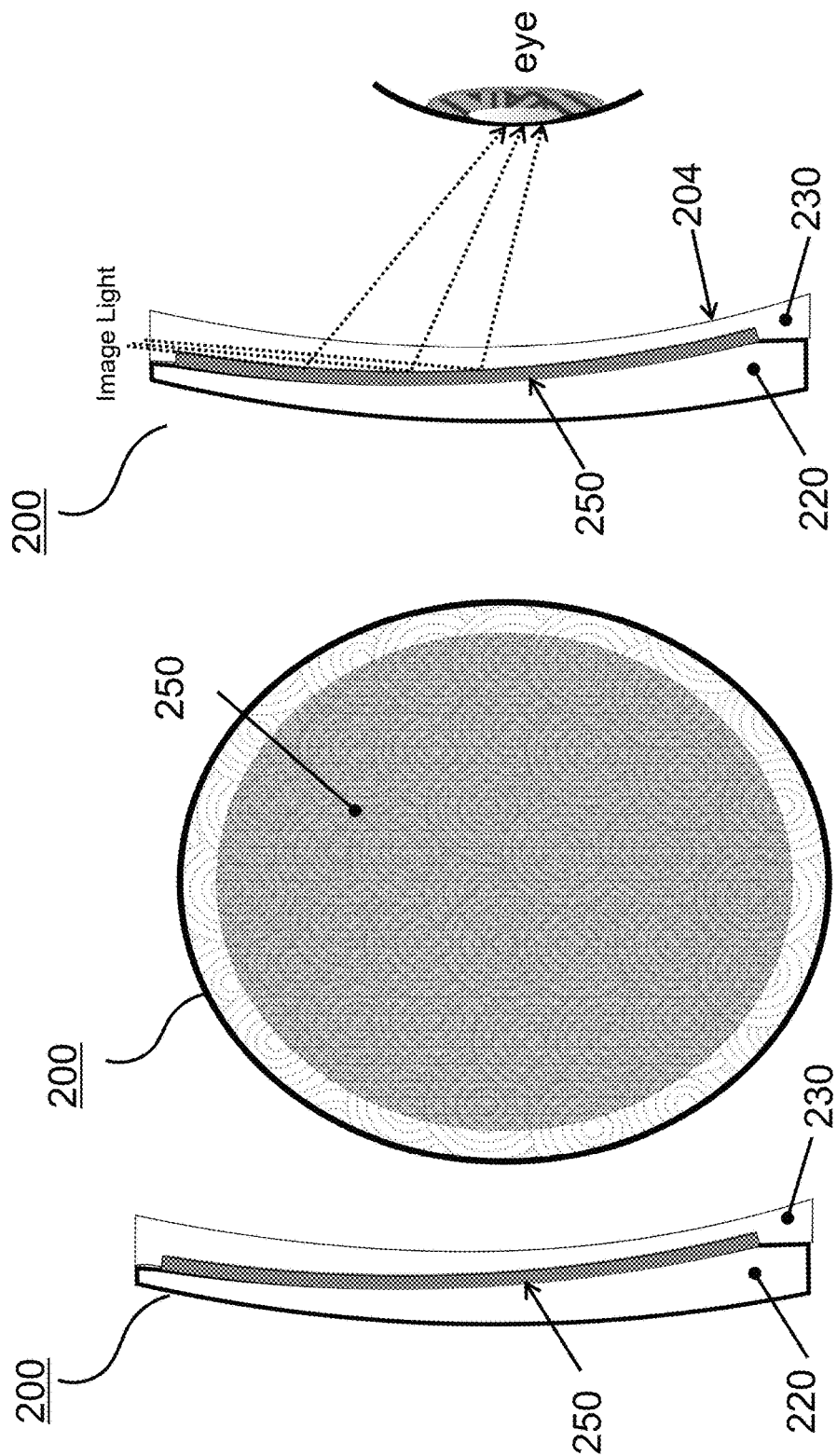

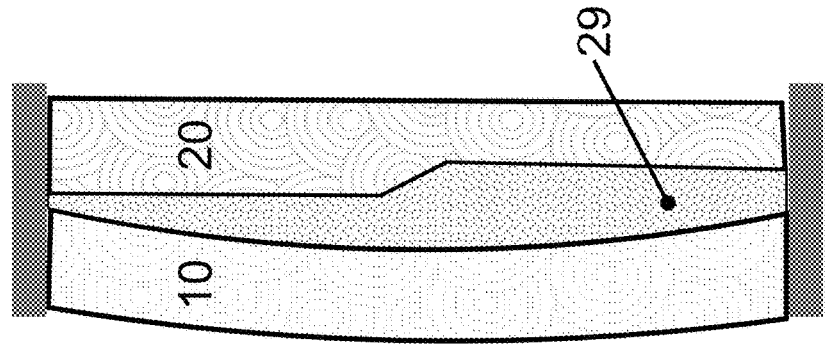
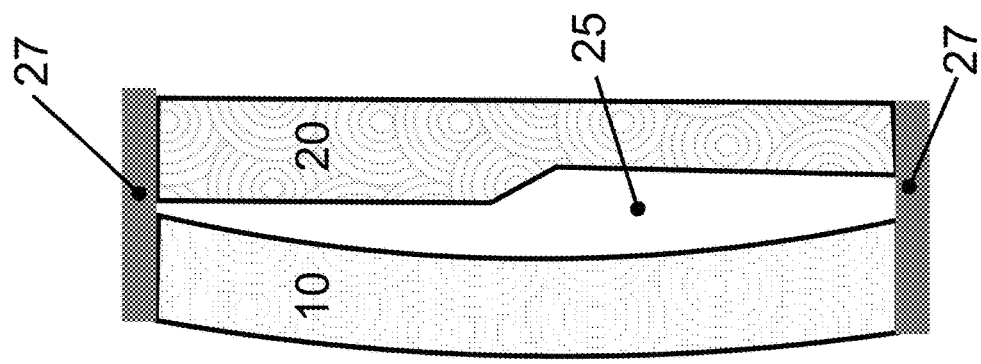
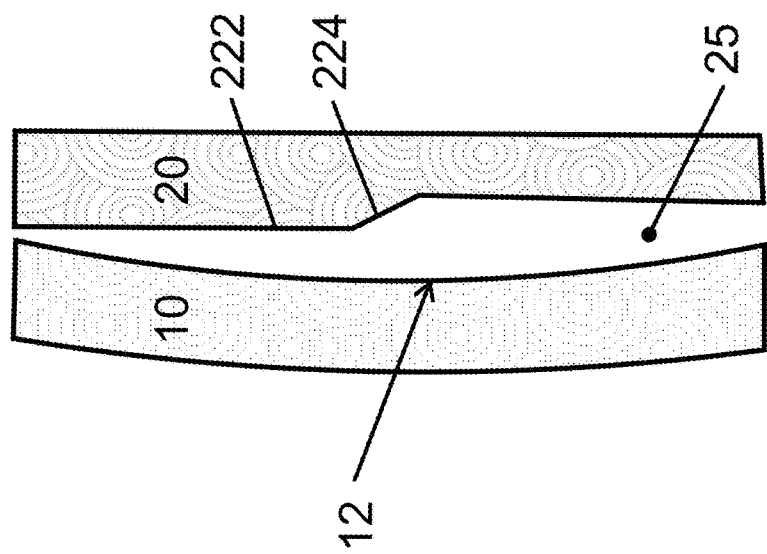
FIG. 8C
FIG. 8B
FIG. 8A

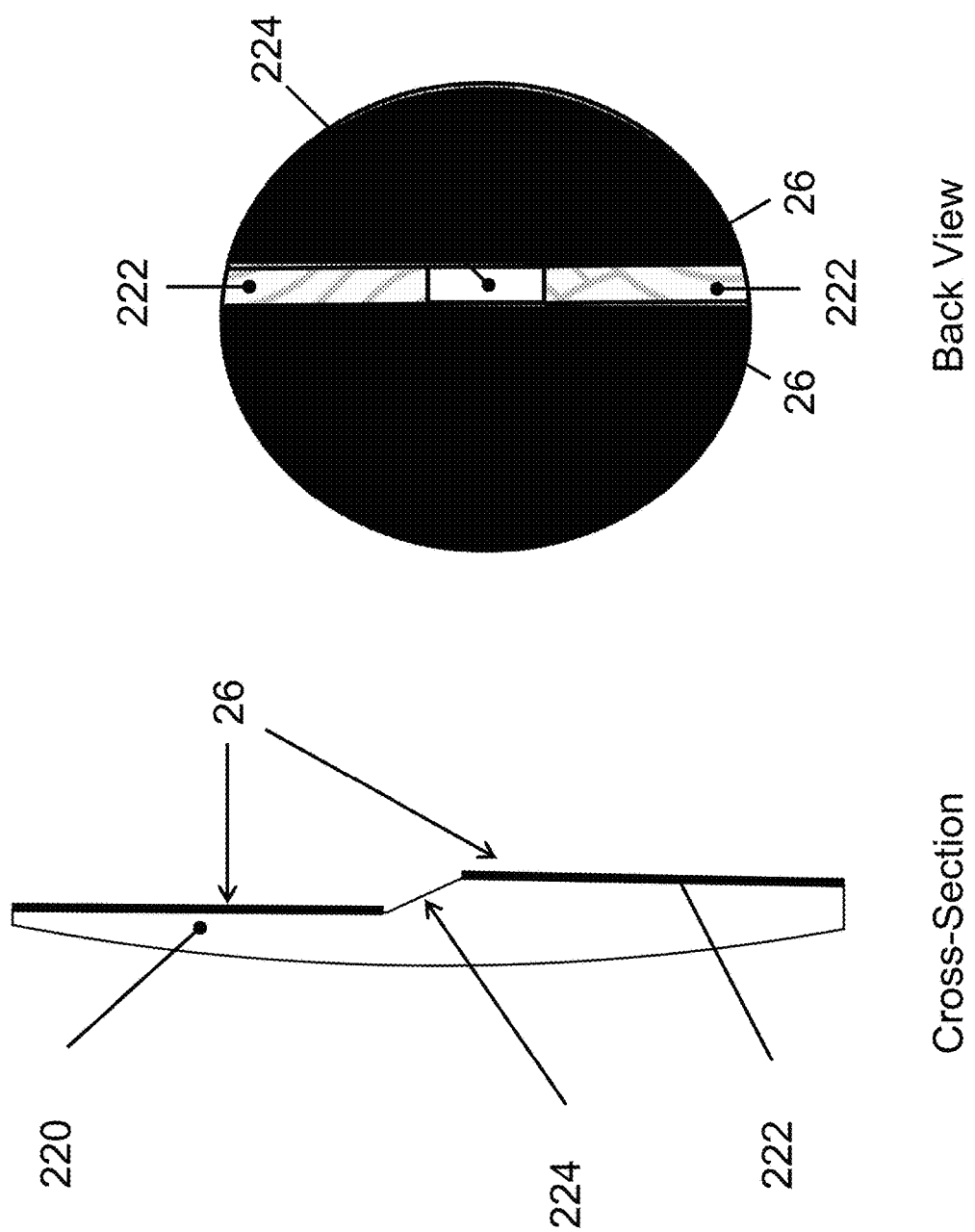

Back View

Cross-Section

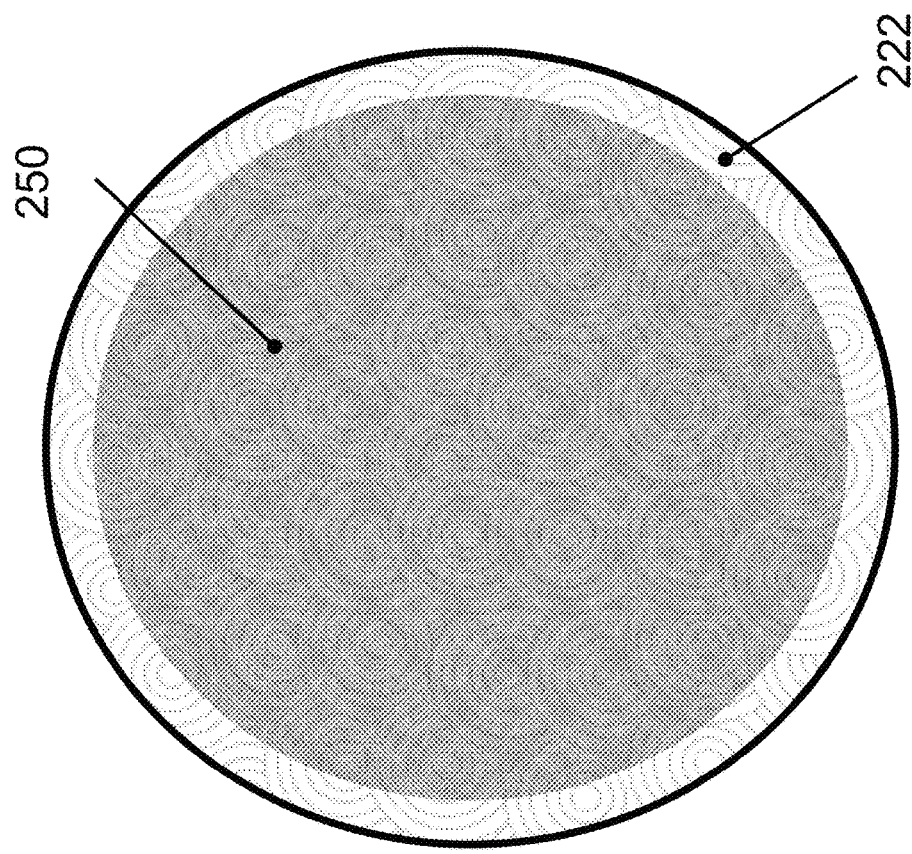
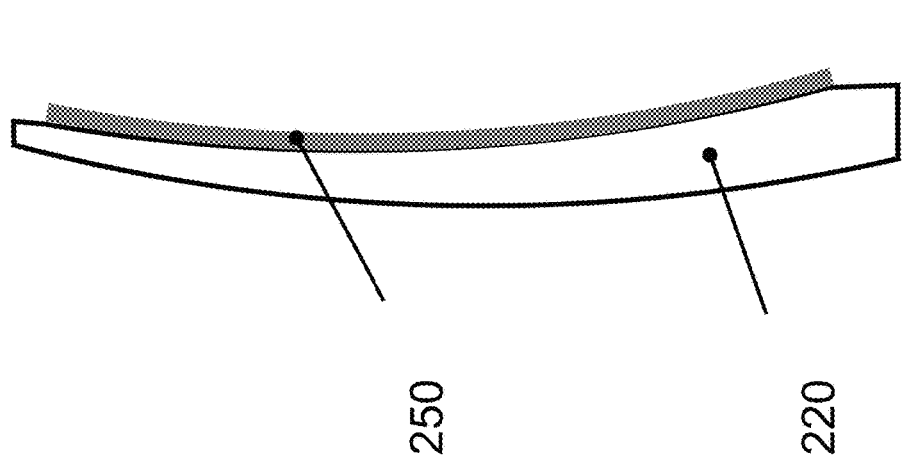
FIG. 9D

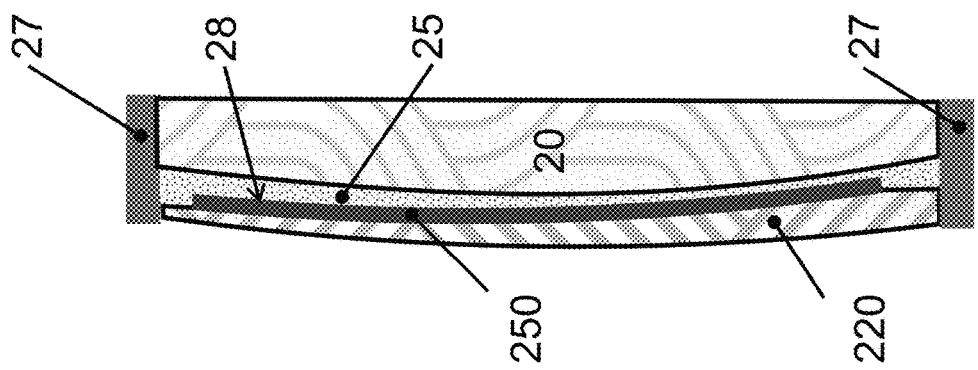
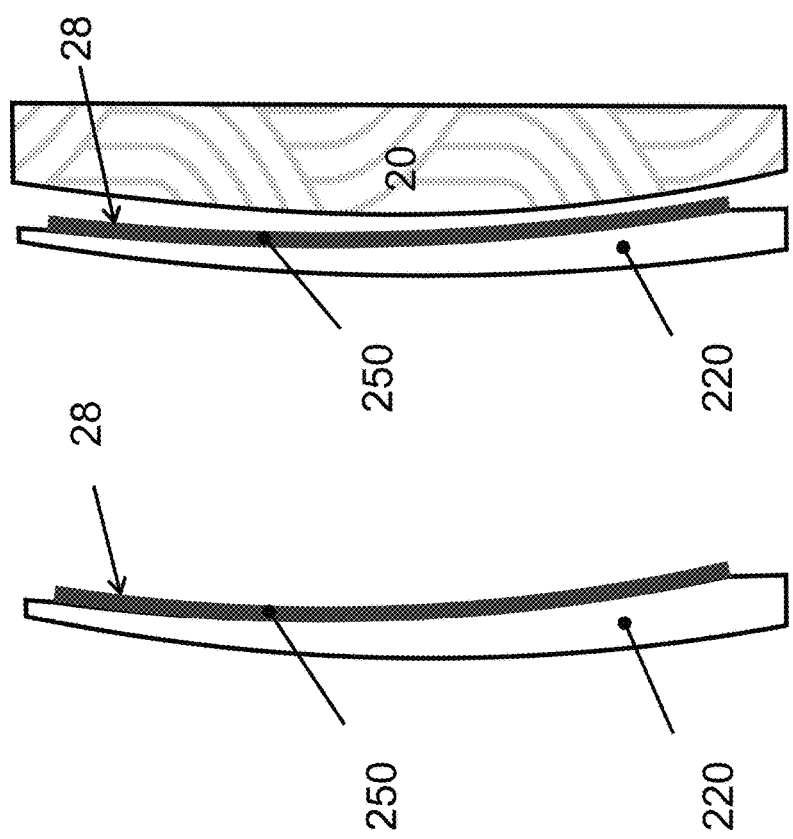
FIG. 9E  FIG. 9F  FIG. 9G

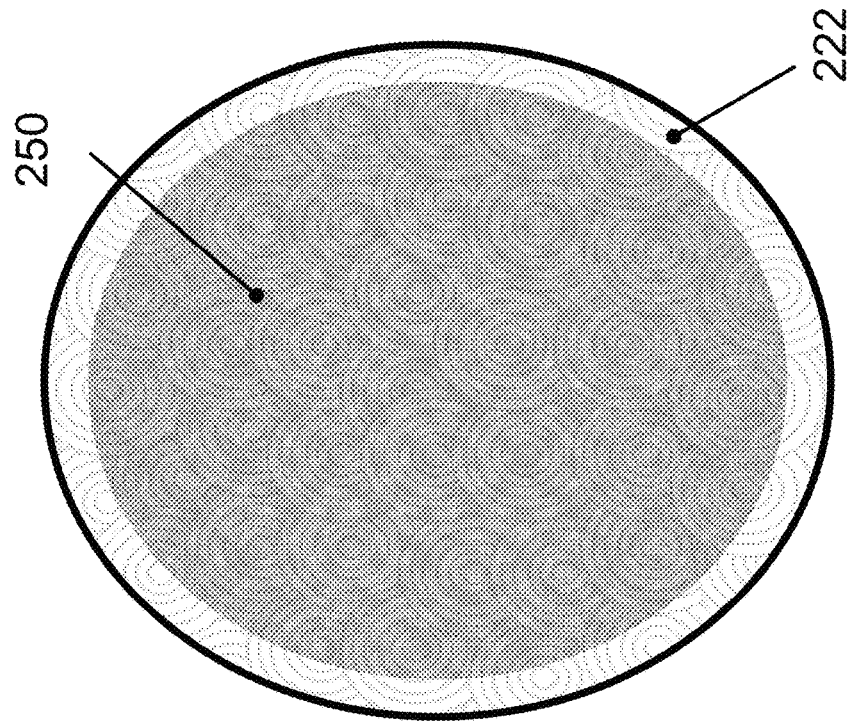
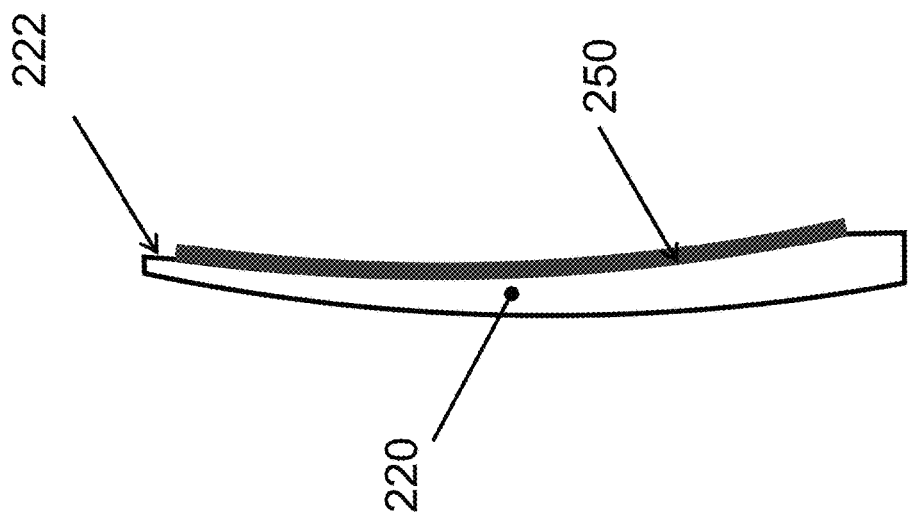
FIG. 10C

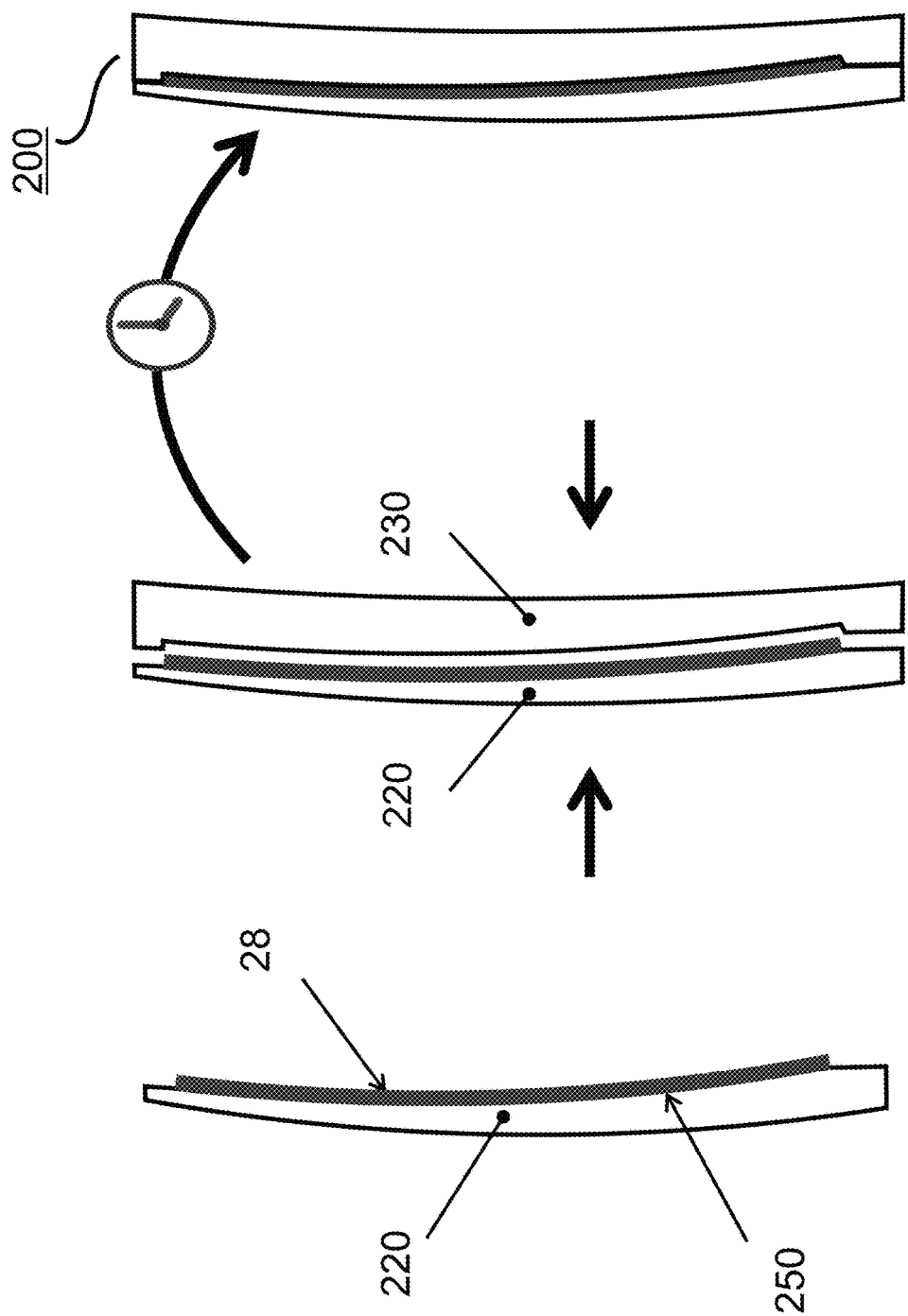

LENS FOR DISPLAYING A VIRTUAL IMAGE

RELATED U.S. APPLICATIONS

This application claims priority to U.S. Provisional Patent Application Ser. No. 62/114,335, filed Feb. 10, 2015, U.S. Provisional Patent Application Ser. No. 62/114,350, filed Feb. 10, 2015, U.S. Provisional Patent Application Ser. No. 62/114,362, filed Feb. 10, 2015, U.S. Provisional Patent Application Ser. No. 62/121,903, filed Feb. 27, 2015, and U.S. Provisional Patent Application Ser. No. 62/130,729 filed Mar. 10, 2015, each of which is hereby incorporated herein by reference in its entirety for all purposes.

TECHNICAL FIELD

The present invention relates to augmented reality systems, and more particularly, the display of virtual images in a user's field of vision.

BACKGROUND

Existing augmented reality eyewear suffers from a number of disadvantages. In one aspect, many systems project an image with a focal point very close to the user's eye, causing a user to have to repeatedly shift its focus from close to far to view the image and the surrounding environments, respectively. This can be uncomfortable and distracting to the user. In another aspect, many systems suffer from unpleasant aesthetics, such as thick lenses or protruding hardware. In particular, in an effort to minimize the profile of eyewear frames, some systems provide all or a majority of their image generating hardware within the eyewear lenses. This may make the lenses very thick and heavy. Thicknesses of 5 mm, or even 7 mm-10 mm are not uncommon. Other systems, such as the Epson Moverio BT-200, take an opposite approach, housing all or a majority of image generating hardware in the eyewear frame. Others still, like the Vuzix M100 and Google Glass, take a more modular approach, by housing all the electronics and optics in a device that may attach to conventional eyewear. While this may provide for thinner lenses, the frame may be visually conspicuous. This may make the user feel self-conscious and resistant to wearing the eyewear in public.

In light of these issues, it would be desirable to provide an augmented reality system having an aesthetically pleasing profile approaching that of traditional ophthalmic eyewear, and configured to overlay images at focal points associated with a user's normal field of vision.

SUMMARY OF THE INVENTION

The present disclosure is directed to a lens for projecting a virtual image. The lens may comprise a first body section having a first surface and a second body having a second surface. The first and second body sections may be coupled along the first and second surfaces to form an internal interface within the lens. The lens may further comprise a reflective coating on at least a portion of either the first surface or the second surface. The reflective coating may be configured to redirect light projected into the second body section toward an eye of a wearer of the lens for display as a virtual image.

In various embodiments, the first and second body sections may have the same, substantially similar, or substantially different indices of refraction. The first and second surfaces, in an embodiment, may be cured for correcting vision. In another embodiment, at least one of the first and second body sections may have a curved outer surface for correcting vision. At least a first portion of the first surface may be angled or curved, in an embodiment, so as to direct image light projected into the lens towards an eye of the wearer.

The reflective coating, in an embodiment, may be positioned in a central portion of the lens, and in another embodiment, in a peripheral portion of the lens. In various embodiments, the reflective coating may span a portion or all of the lens diameter. The reflective coating, in some embodiments, may include at least one of silver, nickel, aluminum, titanium, chromium, various dielectric stack materials including metal oxides, silicon oxides, glass or other suitable materials to create a surface which reflect a significant amount of light.

In various embodiments, the reflective coating maybe applied over an optical surface whose local surface geometry is designed to focus the light from an external display to a point in space in front of the user's eye, thus reducing or eliminating the need for external lens optics for such a purpose.

The lens, in some embodiments, may include a third body section positioned on an opposing side of the second body section such that the second body section is situated between the first body section and the third body section. The first and third body sections, in an embodiment, may have substantially similar indices of refraction, while the second body section may have a different index of refraction. The second body section, in an embodiment, may form a solid medium through which light is directed and contained between first and second internal interfaces formed with the first and third body sections, respectively, prior to being redirected through the third body section toward an eye of the wearer of the lens for display as a virtual image.

In another aspect, the present disclosure is directed to another lens for projecting a virtual image. The lens may comprise first and second body sections having different indices of refraction. The second body section may be coupled to the first body section to form an internal interface within the lens. The interface may be configured to redirect light projected into the second body section toward an eye of the wearer of the lens for display as a virtual image. The internal interface, in an embodiment, may have a reflective or refractive property.

In yet another aspect, the present disclosure is directed to a method for manufacturing a lens for displaying a virtual image. The method may include providing a first body section having a first surface, and casting, on the first surface of the first body section, a material for forming a second body section. The material may be cured to form the second body section and bond it to the first body section to form a unitary lens body.

The first and second body sections, in various embodiments, may be formed of glass, acrylate, CR-39, or allyl diglycol carbonate, Trivex, or other urethane based materials, high index plastics, such as MR10, or other thiourethanes, or polycarbonate. The first body section, in an embodiment, may have a substantially similar index of refraction as the second body section, and in another embodiment, may have a substantially different index of refraction.

A mold, in an embodiment, may be positioned opposite the first surface of the first body section to form a cavity therebetween. A material from which the second body section may be introduced into the cavity as part of forming the second body section. Curing, in some embodiments, may include at least one of exposing the material to heat and exposing the material to ultraviolet or other wavelengths of light.

A coupling material, in an embodiment, may be applied on the first surface of the first body section. This may facilitate bonding of the second body section to the first body section during the casting process.

In various embodiments, a reflective material may be coated onto at least a portion of the first surface of the first body section. The reflective material, in an embodiment, may be transparent or translucent. A protective material may be applied over the reflective material, in an embodiment, to protect the reflective material from reacting with reagents in the material from which the second body section is formed.

BRIEF DESCRIPTION OF DRAWINGS

For a more complete understanding of this disclosure, reference is now made to the following description, taken in conjunction with the accompanying drawings, in which:

FIGS. 2A and 2B depict schematic views of pathways along which image light may be directed through augmented reality eyewear and towards an eye of the wearer, in accordance with embodiments of the present disclosure;

FIGS. 3A-3C illustrate various views of a lens for displaying a virtual image, in accordance with one embodiment of the present disclosure;

FIGS. 6A and 7A depict cross sectional views of lenses having reflectors, in accordance with embodiments of the present disclosure;

FIGS. 6B and 7B depict schematic views of pathways through the lenses of FIGS. 6A and 7A along which image light may be directed toward the eye of a wearer of augmented reality eyewear, in accordance with embodiments of the present disclosure;

FIGS. 8A-8M depict steps of an overcasting or overmolding process for manufacturing a lens, in accordance with one embodiment of the present disclosure;

FIGS. 9A-9J depict steps for forming a lens in which a first body section is at least partially shaped by a machining process, in accordance with one embodiment of the present disclosure; and FIGS. 10A-10F depict steps for forming a lens from separately-formed body sections, in accordance with one embodiment of the present disclosure.

DESCRIPTION OF SPECIFIC EMBODIMENTS

Embodiments of the present disclosure generally provide a lens 200 for displaying a virtual image in a field of vision of a user and methods for making the same. Lens 200, in various embodiments, may be used in augmented reality eyewear 100.

A virtual image is formed when incoming light rays are focused at a location beyond the source of the light rays. This creates the appearance that the object is at a distant location, much like a person's image appears to be situated behind a mirror. In some cases, the light rays are focused at or near infinity. Augmented reality eyewear 100 can utilize embodiments of lens 200 enhance a user's interaction with its environment by projecting a virtual image(s) in a user's field of vision, thereby overlaying useful images or information over what the user would naturally see.

Augmented Reality Eyewear 100

Figure 1:
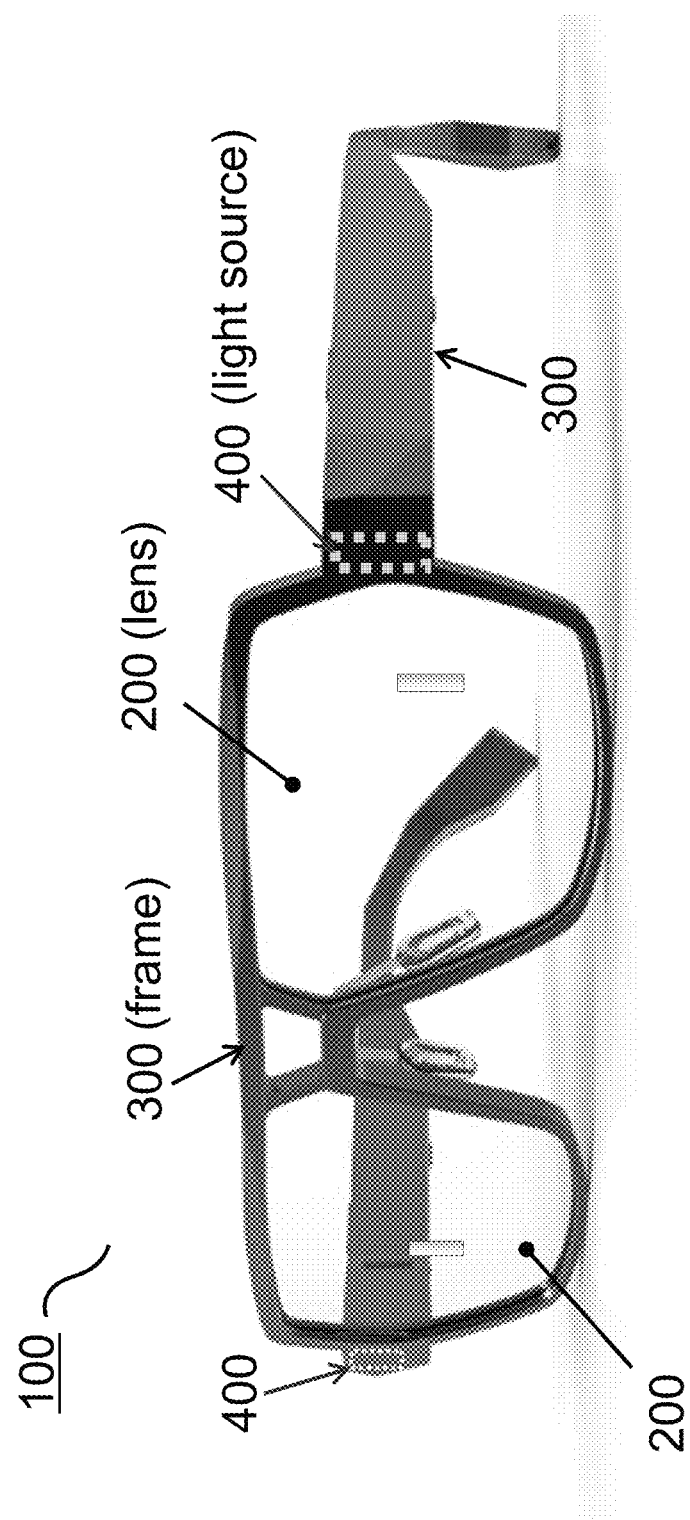
FIG. 1 illustrates a perspective view of augmented reality eyewear, in accordance with one embodiment of the present disclosure.

FIG. 1 illustrates a representative embodiment of augmented reality eyewear 100. Augmented reality eyewear may generally include one or more lenses 200, a frame 300, and a light source 400 (not shown). Generally speaking, frame 300 may secure and position lenses 200 in front of a wearer's eyes, and light source 400 may generate light containing a real image ("image light") that is manipulated by lens 200 and displayed to the wearer as a virtual image.

Figure 2B:
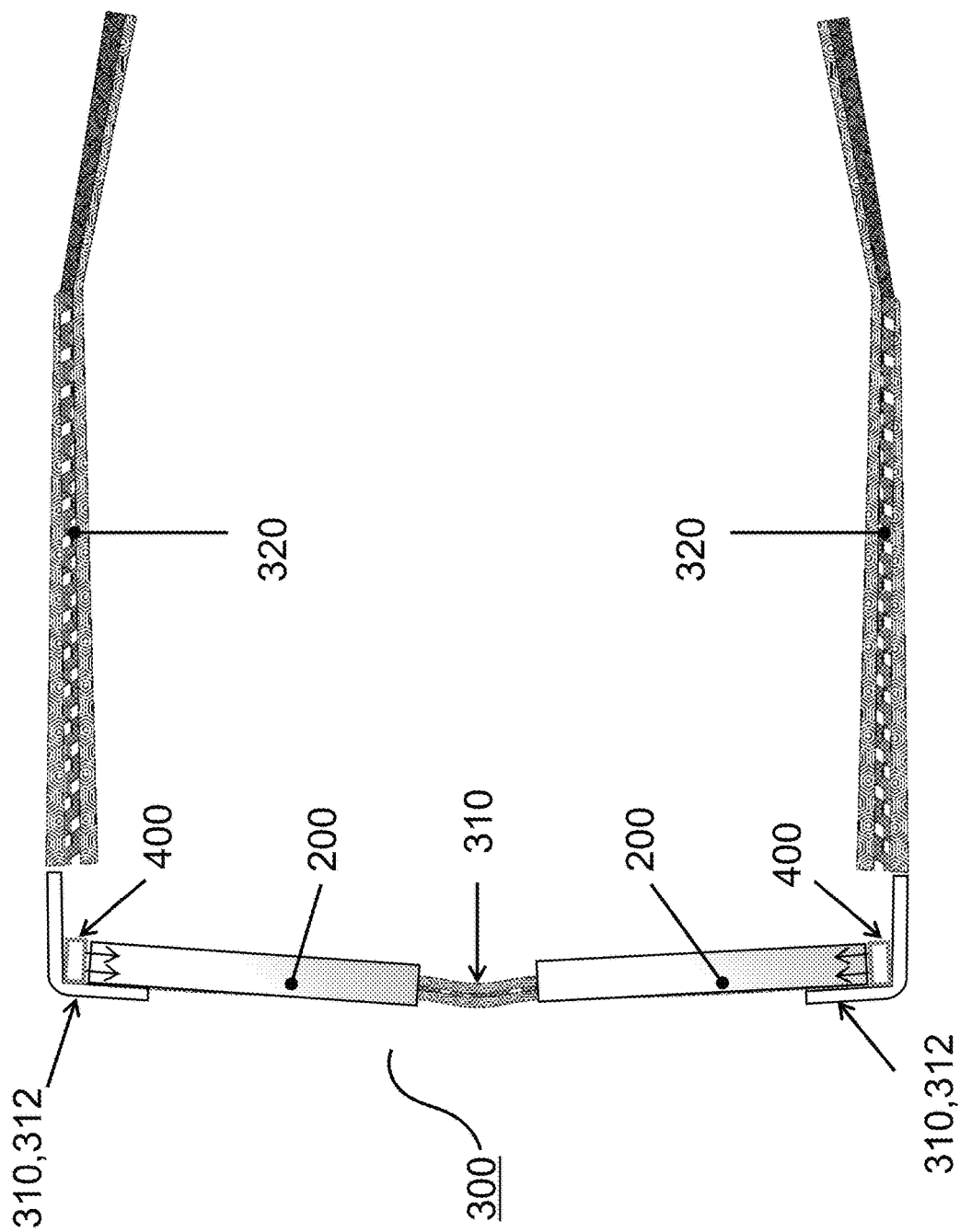

FIGS. 2A and 2B schematically depict illustrative configurations of frame 300 and light sources 400, along with illustrative pathways along which image light it directed through augmented reality eyewear 100 and towards a wearer's eye for display as a virtual image.

Frame 300, in a representative embodiment, may take the form of a pair of spectacle frames, generally including a frame front 310 and frame arms (also known as temples) 320. Of course, frame 300 may take any other suitable form including, without limitation, a visor frame, a visor or drop down reticle equipped helmet, or a pince-nez style bridge for lenses 200 on the nose of the user.

Light source 400 may include any suitable device for emitting a light beam associated with an image to be displayed. In various embodiments, light source 400 may include, without limitation, an electronic visual display such as an LCD display, a front lit LCD, a back lit LCD display, said back lit display possibly lighted by natural or artificial light, such as, a man made light source, such as an LED, an OLED or organic light emitting diode display. Light source 400 may additionally or alternatively include a laser diode, liquid crystal on silicon (LCOS) display, cathodoluminescent display, electroluminescent display, organic light emitting diode (OLED) display, photoluminescent display, and incandescent display, amongst any other suitable devices.

Frame 300 may house lens(es) 200 and light source(s) 400 in any configuration suitable for optically coupling lens 200 with light source 400. In various embodiments, frame 300 may support lens 200 in frame front 310 and light source 400 in frame arm 320, and provide an optical pathway 410 therebetween. In one such embodiment, light source 400 may be situated in frame arm 310, and emit light along an optical pathway 410 extending from light source 400, through a portion frame arm 320, into frame front 310, and towards outer edge 206 of lens 200. In another embodiment, light source 400 may be situated in an end piece 312 of frame front 310, and be oriented laterally to direct light along an optical pathway 410 extending directly from light source 400 towards outer edge 206 of lens 200, as shown in FIG. 2A. While not limited in this manner, it should be recognized that configurations in which light source 400 is housed in frame front 310 may be preferable, as frame arms 320 may flex, or rotate about the hinges, making it more difficult to properly transmit light from light source 400 located in frame arm 320. In yet another embodiment, light source(s) 400 may be coupled to lens 200 itself, as shown in FIG. 2B. As configured, torques applied to frame 300 may not affect the alignment of light source 400 with lens 200. Instead, frame front 310 (including end piece 312) may flex around light source 400.

As configured, virtual images displayed by augmented reality eyewear 100 of the present disclosure will originate from within the plane of lens 200. Such an arrangement differs considerably from other display technologies in the arrangement of the present invention has the optical elements completely contained within the ophthalmic lens and/or waveguide, and not necessarily attached to a frame front, end piece, or temple. For example, the ReconJet system by Recon Instruments, has a display placed in front of a lens that allows the wearer to see the image of said display in focus. And for example the Google Glass product, which is similar the ReconJet System, but that also requires an additional lens placed behind the optical system.

Frame 300, at least in part by virtue of the relatively slim-profile of lenses 200 provided herein, may have similar lines, thickness, and appearance as ordinary ophthalmic eyewear, as compared to more bulky and potentially less-aesthetically-pleasing profiles associated with many other forms of virtual reality and augmented reality eyewear developed to date. This may facilitate social acceptance of augmented eyewear 100. Embodiments of augmented reality eyewear 100 may be used standalone, or as a companion device to a mobile phone (or other suitable electronic device) for processing information from the mobile phone, a user, and the surrounding environment, and displaying it in a virtual image to a user, amongst other possible uses.

Additional embodiments of augmented reality eyewear 100 are more fully described in U.S. patent application Ser. No. 14/610,930, filed Jan. 30, 2015, which is hereby incorporated by reference in its entirety for all purposes.

Virtual Image Lens 200

As shown in FIGS. 3A-3C, lens 200 of augmented reality eyewear 100 may include a front surface 202, a back surface 204, an edge 206, and a body 208 defining a thickness of lens 200. In various embodiments, body 208 may be formed of two or more body sections 220, 230.

First body section 220, in various embodiments, may define a front portion of lens 200. Accordingly, first body section 220 may define at least a portion of, or potentially all of, front surface 202 and edge 206, as shown. As shown in FIG. 3B, first body section 220 may further include a surface 222 on an opposing side from front surface 202.

Second body section 230, in various embodiments, may define a rear portion of lens 200. Accordingly, second body section 230 may define at least a portion of, or potentially all of, back surface 204 and edge 206, as shown. As shown in FIG. 3C, second body section 230 may further include a surface 232 on an opposing side from back surface 204. Surface 232, in various embodiments, may be shaped to provide a flush fit with surface 222 of first body section 220, thereby defining an interface 210 between first body section 220 and second body section 230 as shown in FIG. 3A.

Figure 4:
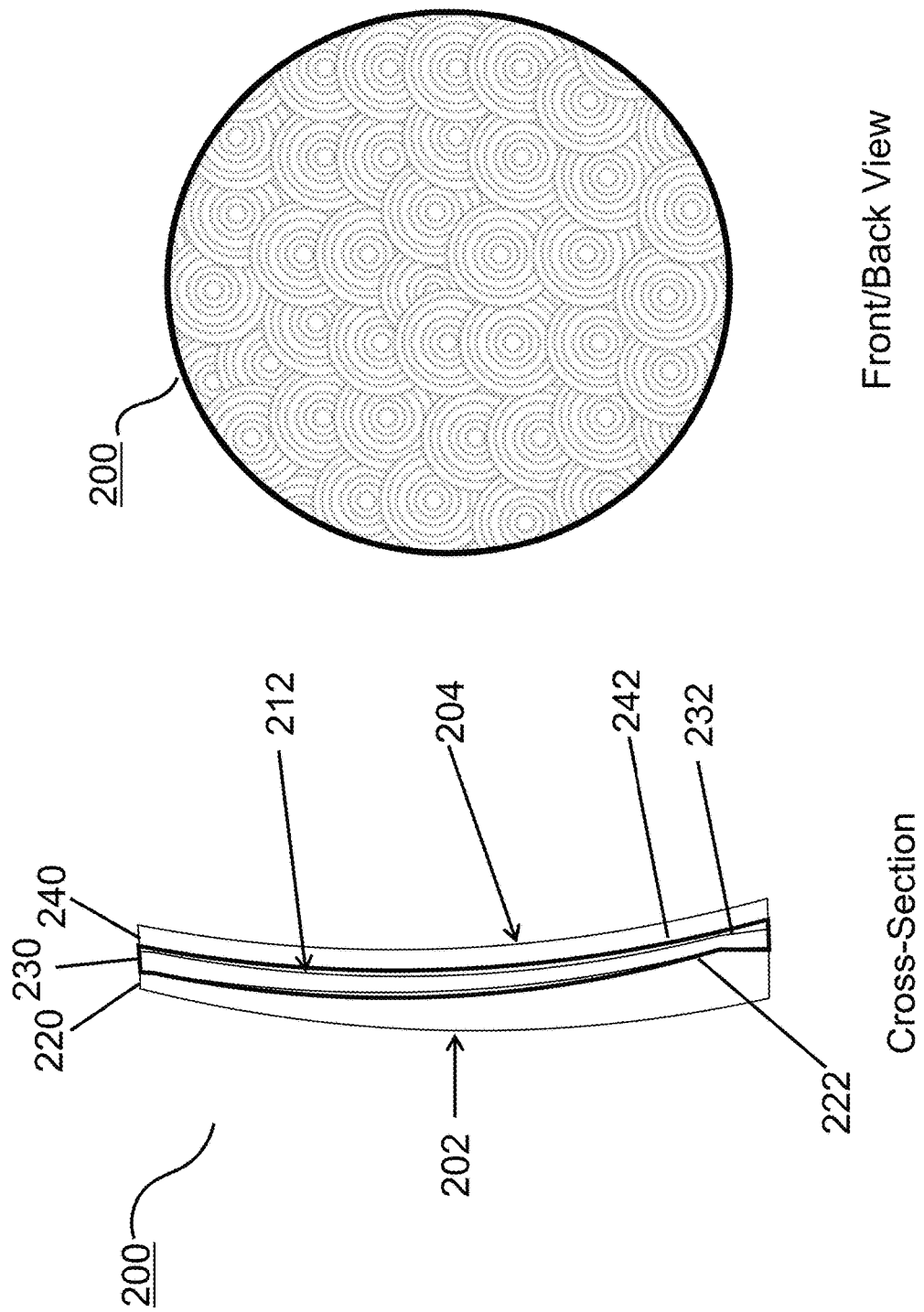
FIG. 4 depicts a cross sectional view of a lens for displaying a virtual image, in accordance with another embodiment of the present disclosure.

In another embodiment, as shown in FIG. 4, lens 200 may further include a third body section 240 positioned on an opposing side of second body section 230 such that the second body section 230 is situated between the first body section 220 and the third body section 240. A first surface 242 of third body section 240 may couple with surface 232 of second body section 230, and thereby define an interface 212 between surfaces 232 and 242. Similar to first body section 220 and second body section 230, third body section 240 may form a portion of edge 206 of lens 200 in embodiments in which third body section extends to edge 206 of lens 200.

In various embodiments, one or more of body sections 220, 230, 240 may be provided with different indices of refraction. In both configurations, ambient light entering lens 200 at a substantially normal angle of incidence may be allowed to pass through to the wearer's eye, thereby allowing the wearer to see the surrounding environment as he/she normally would with traditional eyewear. However, in embodiments of lens 200 having differing indices of refraction in body sections, light striking the interface(s) between body sections at shallow or oblique angles of incidence may be reflected back into the respective body section from which it came. Lens 200 can thus be configured to receive image light from light source 400 and redirect it towards the wearer's eye in a manner suitable to project a corresponding virtual image in the wearer's field of view.

Figure 5B:
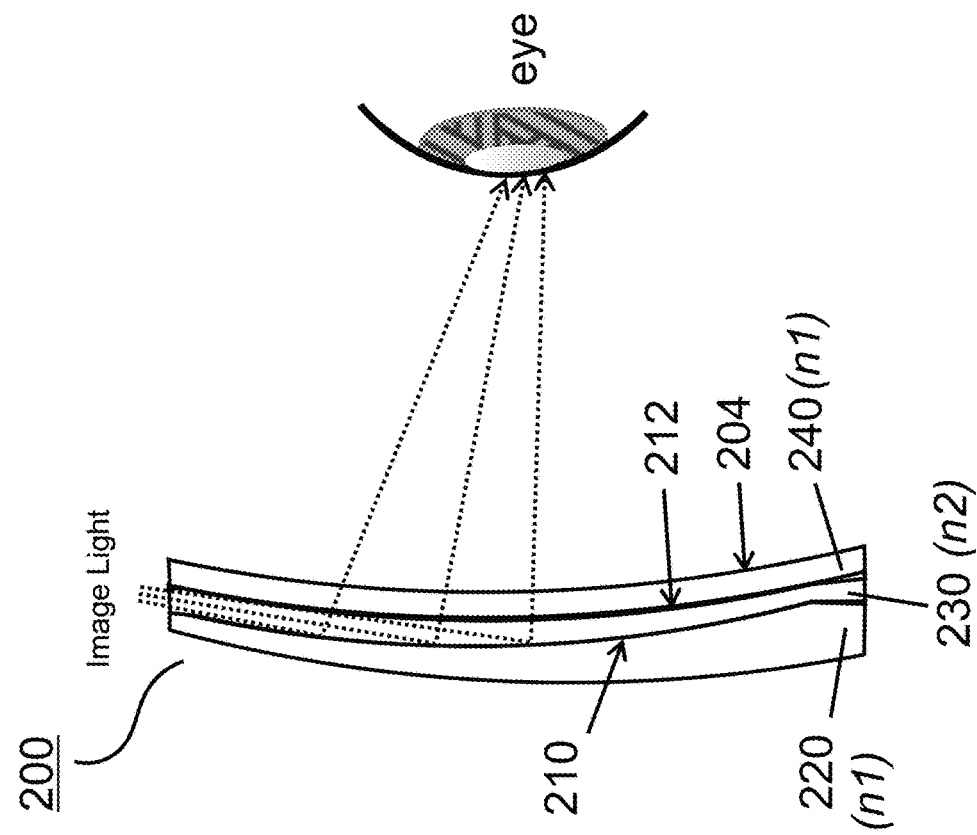
FIGS. 5A and 5B depict schematic views of pathways along which image light may be directed toward the eye of a wearer of augmented reality eyewear, in accordance with embodiments of the present disclosure.
Figure 5A:
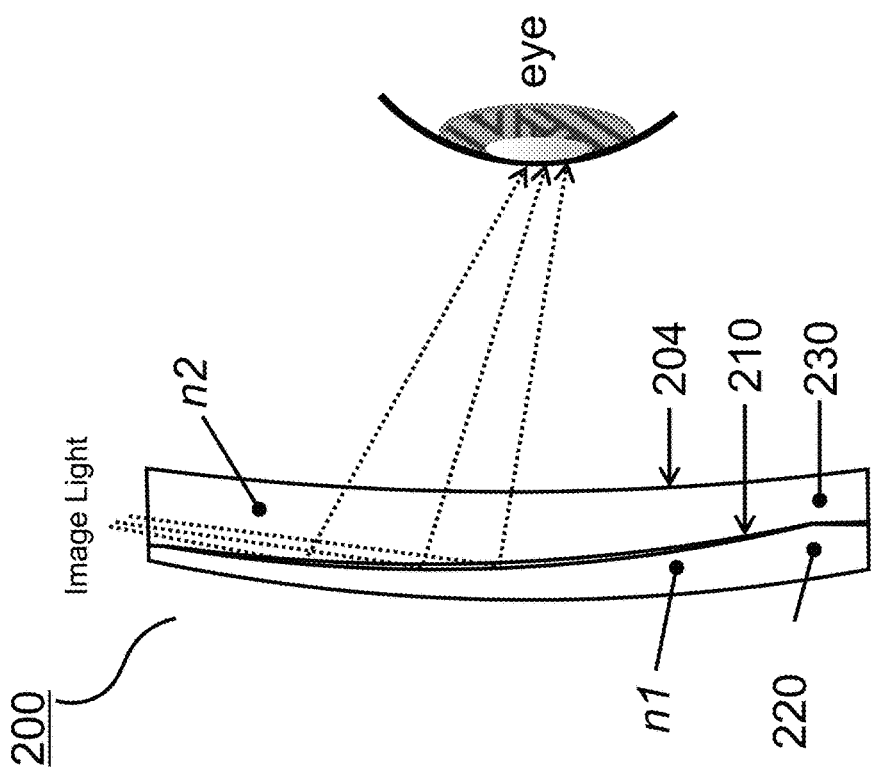

FIG. 5A depicts one such embodiment of lens 200 having a first body section 220 of a substantially different index of refraction $n_1$ than an index of refraction $n_2$ of second body section 230. As configured, interface 210 may form a reflective boundary within lens 200, serving to redirect image light traveling within lens body 208 through back surface 204 and towards the wearer's eye. While not intended to be limited as such, image light may be introduced through a periphery of lens 200 (e.g., through edge 206) and transmitted through second body section 230 towards interface 210. Image light striking interface 210 at a shallow or oblique angle may be redirected back through second body section 230 and through back side 204 of lens 200 towards the wearer's eye for display as a virtual image. Ambient light, on the other hand, is allowed to pass through interface 210 and the whole of lens 200, thereby allowing the user to see the surrounding environment as he/she normally would with traditional eyewear. The virtual image may appear to overlay the natural scene.

FIG. 5B depicts another embodiment of lens 200 in which differences in refractory index between body sections may be utilized to form a virtual image. In the present example, first body section 220 and third body section 240 have substantially similar indices of refraction $n_1$, and second body section 240 has a substantially different index of refraction $n_2$ than that of first and third body sections 220, 240. As configured, interfaces 210 and 212 may form a reflective boundaries along the sides of second body section 230, promoting total internal reflection within second body section 230. Image light may be channeled through second body section 230 and towards one or more locations within lens 200 from which it is ultimately reflected toward the eye for display as a virtual image, as shown.

It should be recognized that, in various embodiments, lens 200 having body sections of different indices of refraction may have multi-focal or progressive properties, making them suitable for treating patients suffering from presbyopia. Further, the different indices of refraction may be tailored to supplement or alter the refractive power of lens 200, thereby providing an additional or alternative construction for correcting vision to that of shaping front and/or back surfaces 202, 204 of lens 200.

Referring now to FIGS. 6A-6B and 7A-7B, lens 200 may additionally or alternatively be provided with one or more reflectors 250. Reflector 250, in various embodiments, may be included in embodiments of lens 200 having body sections with substantially similar refractive indices, as well as those with differing refractive indices.

Reflector 250, in various embodiments, may include a material having reflective properties such as, without limitation, silver, nickel, aluminum, various dielectric stack materials including metal oxides, and glass. In some embodiments, reflector 250 may take the form of silver sputtered or evaporated coatings, dielectric stacks, silver coatings titanium coatings, chromium coatings, nickel coatings, and aluminum coatings. As shown in the embodiment of FIGS. 6A-6B and 7A-7B, reflector 250 may include a coating(s) of such material on an internal surface (or surfaces) of lens 200. For example, reflector 250 may include a coating(s) of reflective material on any one or combination of internal surfaces 222, 232 within lens body 208. In another embodiment (not shown), reflector 250 may include a mirror or other discrete reflective object. In various embodiments, the reflective material may be substantially transparent so as to maximize an amount of ambient light from the surrounding environment to penetrate lens 200 and reach the wearer's eye. One of ordinary skill in the art may recognize, in light of and within the scope of the present disclosure, other suitable equivalents.

Reflector 250, in various embodiments, may be configured for redirecting image light towards the wearer's eye for generating a corresponding virtual image. Additionally or alternatively, reflector 250 may be configured for vectoring image light within lens body 208 towards a location or locations from which it is ultimately directed towards the wearer's eye. In this context, one or more reflectors 250 may be positioned to serve as a light guide.

Reflector 250 may be of any size, shape, and position within lens 200 suitable for these purposes. FIG. 6A depicts an embodiment of lens 200 including a relatively small, substantially planar reflector 250. It should be noted that lines are provided to show an example location of surface 222 and a representative position of reflect 250 thereon; however, these lines, in various embodiments, would not necessarily be visible to the naked eye in a finished product. In the example shown here, reflector 250 is positioned near a center of lens 200 and canted at a 45° angle toward edge 206. As configured, reflector 250 may receive image light transmitted laterally through lens body 208 and redirect it 90° toward the wearer's eye, as shown in corresponding FIG. 6B. Of course, reflector 250 could be placed anywhere within lens 200 and with any suitable angle for achieving similar functionality.

It should be recognized that the position and angle of reflector 250 may serve to determine where in the wearer's field of vision the virtual image appears. For example, reflector 250 may be placed in an outer portion of lens 200 and angled so as to display a virtual image in the wearer's peripheral vision. In some applications, this may be desirable so as to minimize distraction to the wearer from virtual image overlay in his/her central field of vision. Further detail concerning illustrative positions of reflector 250 within lens 200 is provided in the context of FIGS. 7A-7H of U.S. patent application Ser. No. 14/610,930, filed Jan. 30, 2015, which is hereby incorporated by reference in its entirety for all purposes.

FIG. 7A depicts an embodiment of lens 200 including a relatively larger reflector 250. While shown as covering most of the diameter of lens 200 in this particular embodiment, it should be appreciated that other embodiments of reflector 250 may span any suitable portion of lens 200. For example, in some embodiments, reflector 250 may span substantially the entire diameter of lens 200. Such a configuration may provide for maximum reflection of image light through back surface 204. In other embodiments, reflector 250 may span a lesser area of lens 200. Such a configuration may provide for ambient light to pass uninterrupted through portions of lens 200 situated around reflector 250, thereby enhancing vision clarity of the surrounding environment. One of ordinary skill in the art will recognize an appropriate size of reflector 250 for a given application. As shown, reflector 250 of FIG. 7A is provided with a substantially concave shape. Such a configuration, in some embodiments, may allow for receiving image light from any number of angles and directing it back out along a central axis, as shown in FIG. 7B.

In various embodiments, an internal surface on or against which reflector 250 is positioned may be configured for orienting reflector 250 within lens 200. For example, in the configuration of FIG. 6A, surface 222 of front body section 220 may include a shelf 224 or other suitable feature for receiving and orienting reflector 250. The internal surface, in various embodiments, may additionally or alternatively be configured to define the shape of reflector 250. This may be particularly true of embodiments in which reflector 250 is malleable, formed as a coating of reflective material, or otherwise shapeable. For example, in the configuration of FIG. 6A, reflective coating 250 may take on the substantially planar shape of shelf 224 on which it is applied. As another example, in the configuration of FIG. 7A, reflective coating 250 may take on the concave shape of surface 222 on which it is applied. In yet another example, reflector 250 may take on a free form profile that varies in shape (e.g., convex, concave, planar) along the length of its profile. In such an embodiment, certain portions may serve as a light guide to vector image light from edge 206 of lens 200 towards a section or sections that ultimately directs the image light out of the lens and towards the eye for display as a virtual image.

It should be recognized that the specific configurations depicted in FIGS. 6A-7B are merely illustrative examples, and that reflector 250 may be provided in lens 200 in any number of suitable shapes, sizes, and positions for directing image light towards a wearer's eye for display as a virtual image.

Lens 200, in an embodiment, may include a protective coating to prevent scratches or abrasions. Lens 200 may also be manufactured so as to be colored, tinted, reflective, reduced glare, or polarized, for increased comfort in bright environments. Lens 200 may also be a transition lens, configured to transition between various states of transparency depending on the brightness of the surrounding environment. In various embodiments, front surface 202 and/or back surface 204 of lens 200 may be shaped to provide an optical power for vision correction; in others, no such optical power shaping is included.

In some embodiments, lens 200 may further include an electrochromic or similar coating for altering the transparency of lens 200. The electrochromic layer may be formed on lens 200 and activated according to known methods in the art. For example, the electrochromic layer, in various embodiments, may be formed from one or more inorganic oxides such as, without limitation, tungsten oxide. Suitable inorganic oxides, in an embodiment, may react to electrical energy by moving charged particles from an ionic conductive layer in and out of one or more inorganic oxide layers, which results in changed light transmission properties. In other embodiments, suitable organic oxides may change light transmission properties as they undergo an oxidation reduction process in the presence of applied electrical energy. In still further embodiments, the electrochromic layer may include a cell of liquid crystal material loaded with a chromic dye. Of course, lens 200 may be provided with any other suitable layer of electrochromic material.

When activated by electrical energy, the electrochromic material may darken, thereby reducing the transparency of lens 200. In an embodiment, this feature may be used to promote enhanced visualization of the virtual image displayed by lens 200. In another embodiment, lens 200 may be darkened to a degree that mostly or completely obscures the wearer's view of the surrounding environment. Such an embodiment may be useful in virtual reality and gaming applications, for example, where the primary focus is on the displayed virtual images, and the wearer need not move or interact with the surrounding environment.

While the various body sections may be physically discrete from one another, they are formed or coupled in a way that gives the appearance of a lens 200 with a unitary body 208. The resulting lens may be substantially transparent without significant visible obstructions that may be noticed by the wearer or other persons looking at the wearer. Further, such a construction, with an internal reflective surface formed within the body of lens 200, allows for displaying a virtual image from within the plane of lens 200 itself, allowing lens 200 to be manufactured with minimal thickness and superior aesthetics, amongst other advantages.

Methods for Manufacturing Lens 200

Further described herein are exemplary methods for manufacturing lens 200 of augmented reality eyewear 100.

Figure 8E:
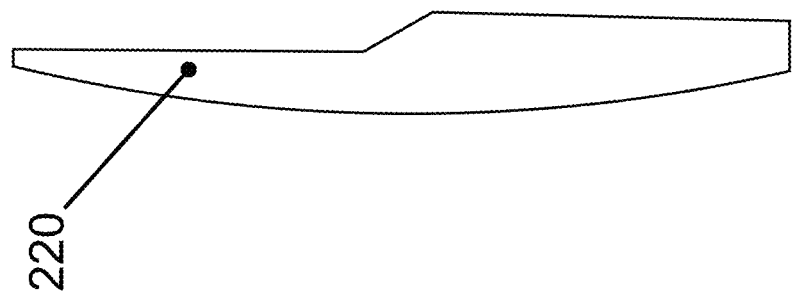

FIGS. 8A-8M depict representative steps for forming an embodiment of lens 200. Referring now to FIGS. 8A-8E, first body section 220 may be formed via a casting process. As shown in FIG. 8A, a first mold 10 may be positioned opposite a second mold 12. First mold 10 may be configured with a profile 12 for defining front surface 202 of first body section 200. Profile 12 may optionally be configured with a curvature for defining a corrective power of lens 200. Second mold 20 may be configured with a profile 22 for defining surface 222 of front body section 220. In the embodiment shown, profile 22 defines a canted surface 24 for imparting a corresponding shelf feature 224 in surface 222 of lens 200. The resulting cavity 25 between profile 12 and profile 22 may define a thickness and overall shape of the resulting front body section 220.

Figure 8D:
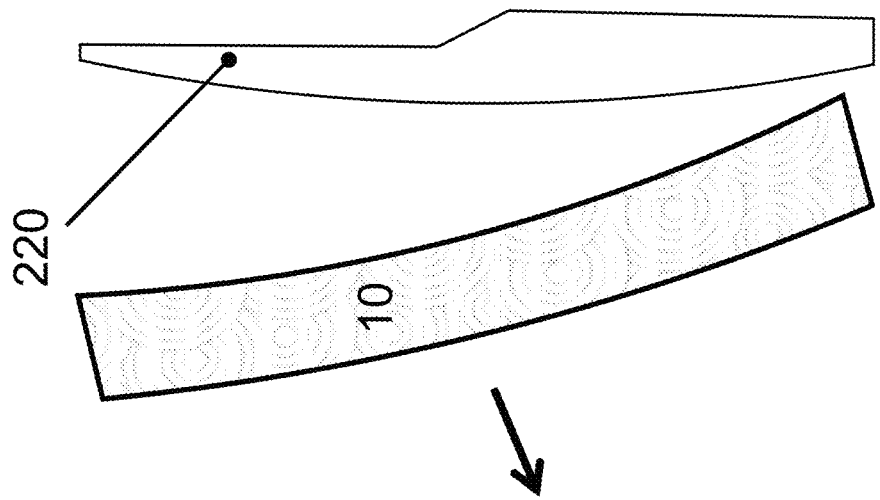

As shown in FIGS. 8B and 8C, cavity 25 may be sealed with a gasket 27 (if necessary), and material 29 for making body section 220 may be introduced into cavity 25. In various embodiments, material 29 may include any suitable material such as, without limitation, thermal sets, like various acrylates such as CR39, newer materials such as PPG's Trivex, high index plastics produced by Mitsui Chemical Inc. such as MR10, MR7 and others, injection moldable plastics such as polycarbonate. Material 29, in an embodiment, may be injected into cavity 25 using known methods in the art. Once introduced, material 29 may then be cured using any suitable method known in the art such as, without limitation, exposure to heat or ultraviolet light. Of course, curing may include any other method for cross-linking, polymerizing, or changing the phase of the body section material 220 into a hardened state. Once cured, gasket 27 may be removed (if used) and body section 220 may be released from first mold 10 and second mold 20, as shown in FIGS. 8D and 8E. Body section 220 may then be cleaned and de-flashed, if necessary, to remove any fingerprints, flash (e.g., shards of lens material), or other contaminates on its surfaces.

Figure 8G:
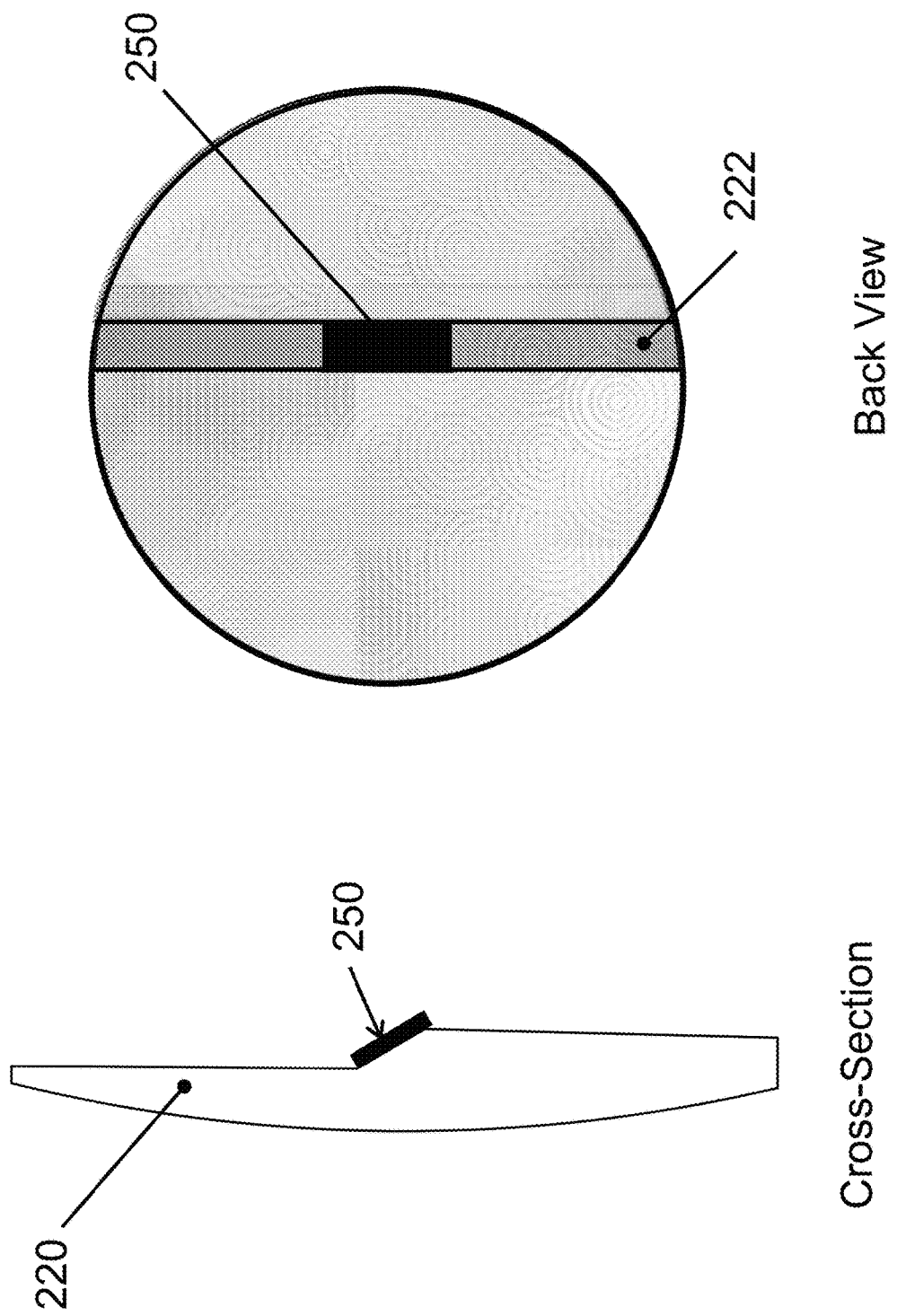

Referring now to FIGS. 8F-8G, in embodiments including one or more reflectors 250, surface 222 may be prepared for receiving reflector 250. As shown in FIG. 8F, in an embodiment, portions of surface 222 may first be masked with a masking material 26 (e.g., tape or any other suitable material), leaving uncovered that area on which reflector 250 is to be positioned. Reflective material may then be applied to the uncovered surface portion, shown here as shelf 224, to form reflector 250 thereon. Coatings of protective materials may optionally be applied on top of reflector 250 to protect the reflective material from being damaged in subsequent steps. For example, a protective material, such as by way of example only Silicon Dioxide, may be applied to protect reflector 250 from reacting with reagents in the monomers and polymers used to form second body section 230, as later described. Masking material 26 may then be removed, as shown in FIG. 8G. It should be noted that in FIGS. 8F and 8G that lines are provided to show an example location of surface 222 and a representative position of reflect 250 thereon; however, these lines, in various embodiments, would not necessarily be visible to the naked eye in a finished product. Referring now to FIG. 8H, a bonding agent 28 may optionally be applied to all or a portion of surface 222 of first body section 220 in preparation for facilitating bonding with second body section 230. Bonding agent 28, in various embodiments, may be applied to exposed portions of surface 222 only, or on both exposed portions of surface 222 and on reflector 250.

Figure 8J:
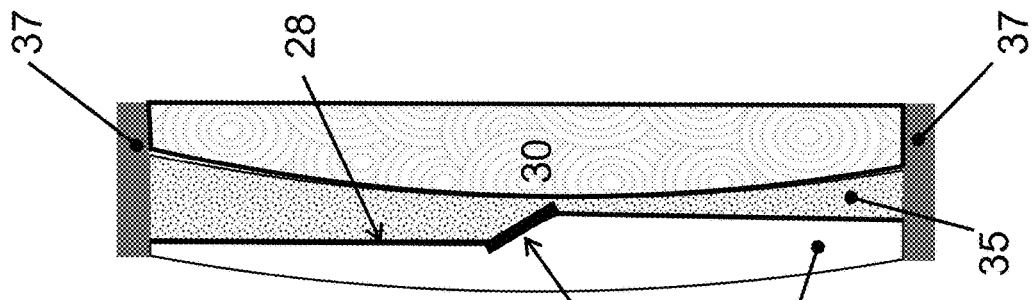
Figure 8I:
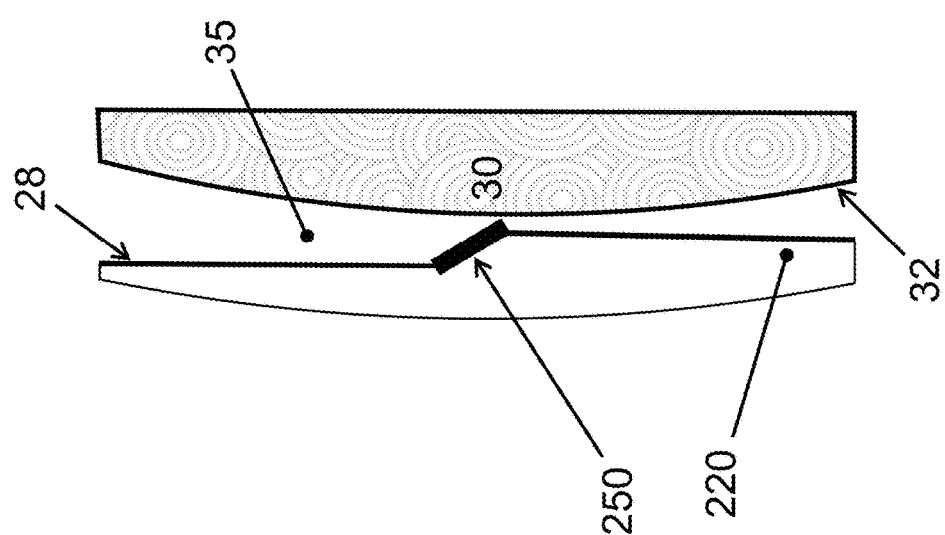
Figure 8H:
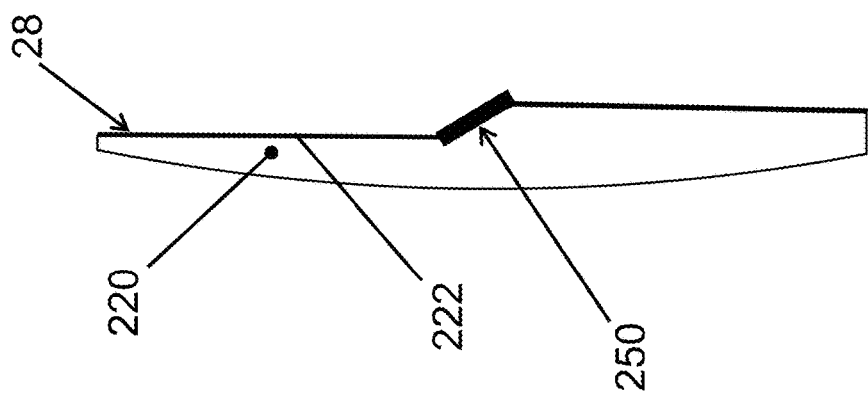

Referring now to FIGS. 8I-8M, in various embodiments, second body section 230 may be formed on and coupled to first body section 220 via a second casting process. In particular, as shown in FIG. 8I, a third mold 30 may be positioned opposite surface 222 of first body section 220. Third mold 30 may be configured with a profile 32 for defining rear surface 204 of second body section 230. Profile 32 may optionally be configured with a curvature for defining a corrective power of lens 200. As configured, surface 222 may act as a profile 32 for defining surface 232 of second body section 230. The resulting cavity 35 between profile 32 and surface 222 or first body section 220 may define a thickness and overall shape of the resulting second body section 230.

Figure 8M:
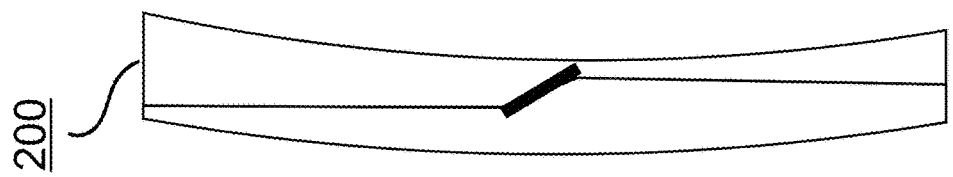
Figure 8L:
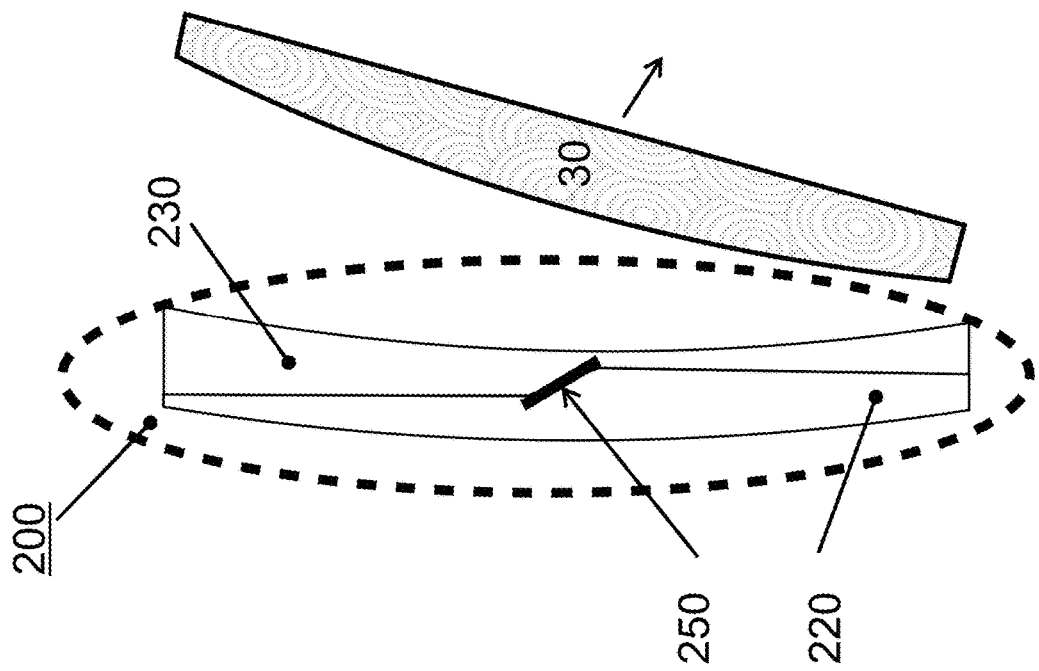
Figure 8K:
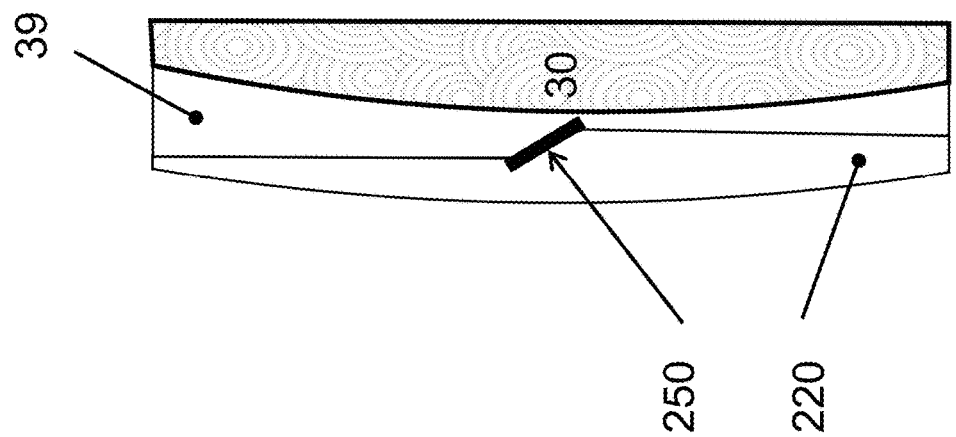

As shown in FIGS. 8J and 8K, cavity 35 may be sealed with a gasket 37 (if necessary), and material 39 for making second body section 230 may be introduced into cavity 35. In various embodiments, material 39 may include any suitable material such as, without limitation, thermal sets, like various acrylates such as CR39, newer materials such as PPG's Trivex, high index plastics produced by Mitsui Chemical Inc. such as MR10, MR7 and others, injection moldable plastics such as polycarbonate. Material 39, in an embodiment, may be injected into cavity 35 using known methods in the art. Material 39 may be chosen to be of substantially similar or substantially different index of refraction to material 29 used to form first lens body 220, depending on the particular application. As previously described, lens 200 may be constructed to redirect image light towards the wearer's eye through any one or combination of refractory index differences and reflector(s) 250.

Once introduced, material 39 may then be cured using any suitable method known in the art such as, without limitation, exposure to heat or ultraviolet light. Of course, curing may include any other method for cross-linking, polymerizing, or changing the phase of the second body section material 230 into a hardened state. Once cured, gasket 37 may be removed (if used) and the resulting lens 200 may be released from third mold 30, as shown in FIGS. 8L and 8M. In this example, second body section 230 has been formed as an additive part on first body section 220, forming an overall integral lens 200. The resulting lens 200 may then be cleaned and de-flashed, if necessary, to remove any fingerprints, flash (e.g., shards of lens material), or other contaminates on its surfaces, and may undergo any other processes in an ophthalmic lab such as surfacing, edging, tinting, etc.

It should be recognized that, in various embodiments, lens 200 may be formed in a similar manner using first and second injection molding processes, or a combination of casting and injection molding processes, rather than just the aforementioned first and second casting processes. One of ordinary skill in the art may consider benefits and drawbacks associated with injection molding and casting processes, such as cure time and materials quality, and will recognize, in light of and within the scope of the present disclosure, which particular process or combination of processes may be best suited for forming the integral lens construction described above for a given application.

Figures 9A, 9B:
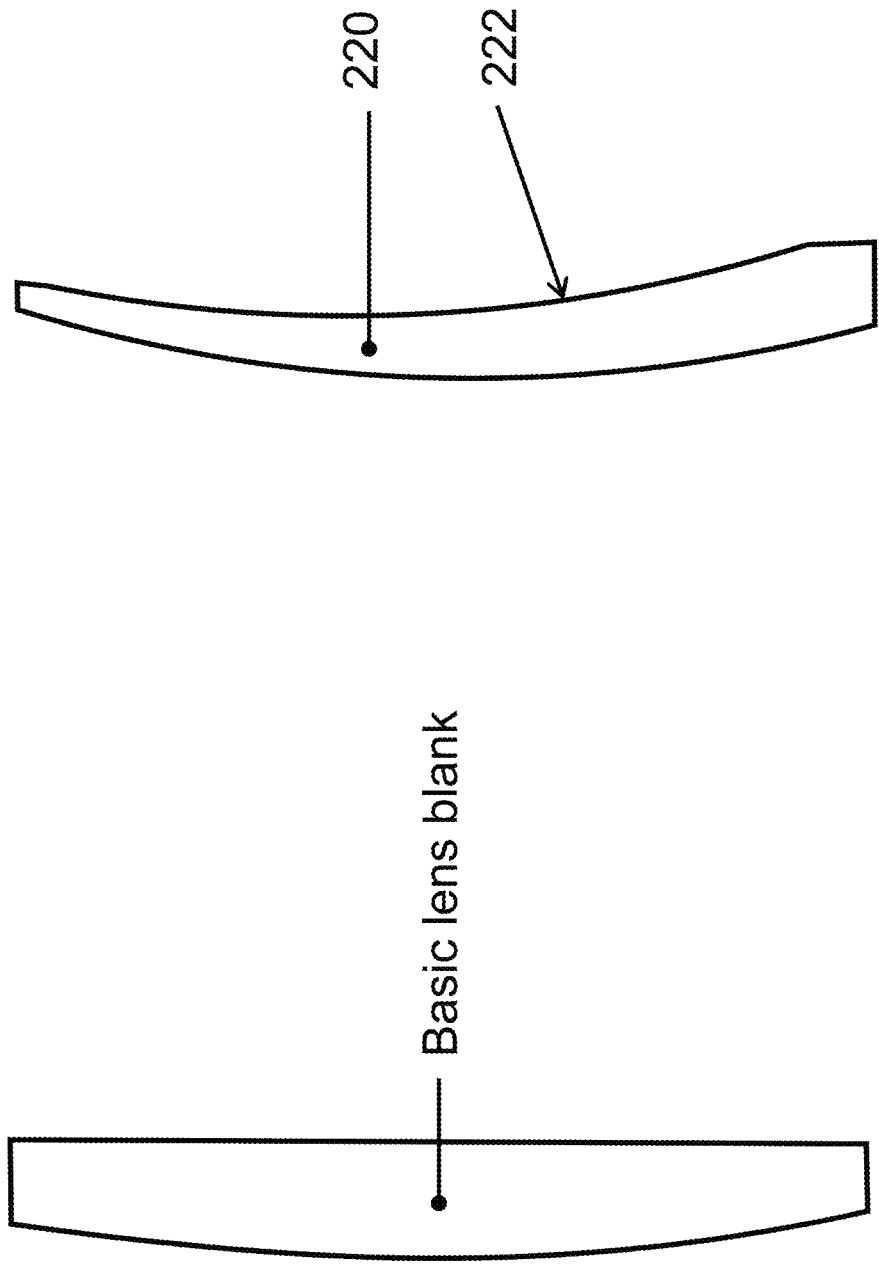

FIGS. 9A-9J depict representative steps for forming an embodiment of lens 200 in which first body section 220 is at least partially shaped by a machining process, rather than being completely shaped by the aforementioned casting and/or molding processes. Referring now to FIG. 9A, first body section 220 may be formed from an existing lens blank or other machinable substrate. At least surface 222, in an embodiment, may be machined into any desired shape suitable for directing image light through second body section 230 and towards the wearer's eye for display as a virtual image, such as those previously mentioned in the present disclosure. Of course, other front surface 202 and/or edge 206 may also be machined as necessary to form lens 200 of suitable shape and corrective power (if desire) for subsequent installation and use in augmented reality eyewear 100. FIG. 9B depicts an embodiment of first body section 220 that has been machined to have a substantially convex surface 222.

Referring now to FIGS. 9C-9J, reflector 250 may be applied to surface 222 of first body section 220 and second body section 230 additively formed thereon in a similar manner as that associated with previous FIGS. 8F-8M. In the present example; however, reflector 250 is provided on concave surface 222 and with a comparatively larger planform than the reflector 250 shown on shelf 224 in FIGS. 8F-8G. It should be recognized that this is merely just another illustrative example configuration, and that the embodiments of lens 200 shown and described in the context of FIGS. 8A-8M AND FIGS. 9A-9J could be formed using any suitable one or combination of the aforementioned casting, molding, or machining methods.

Figure 9C:
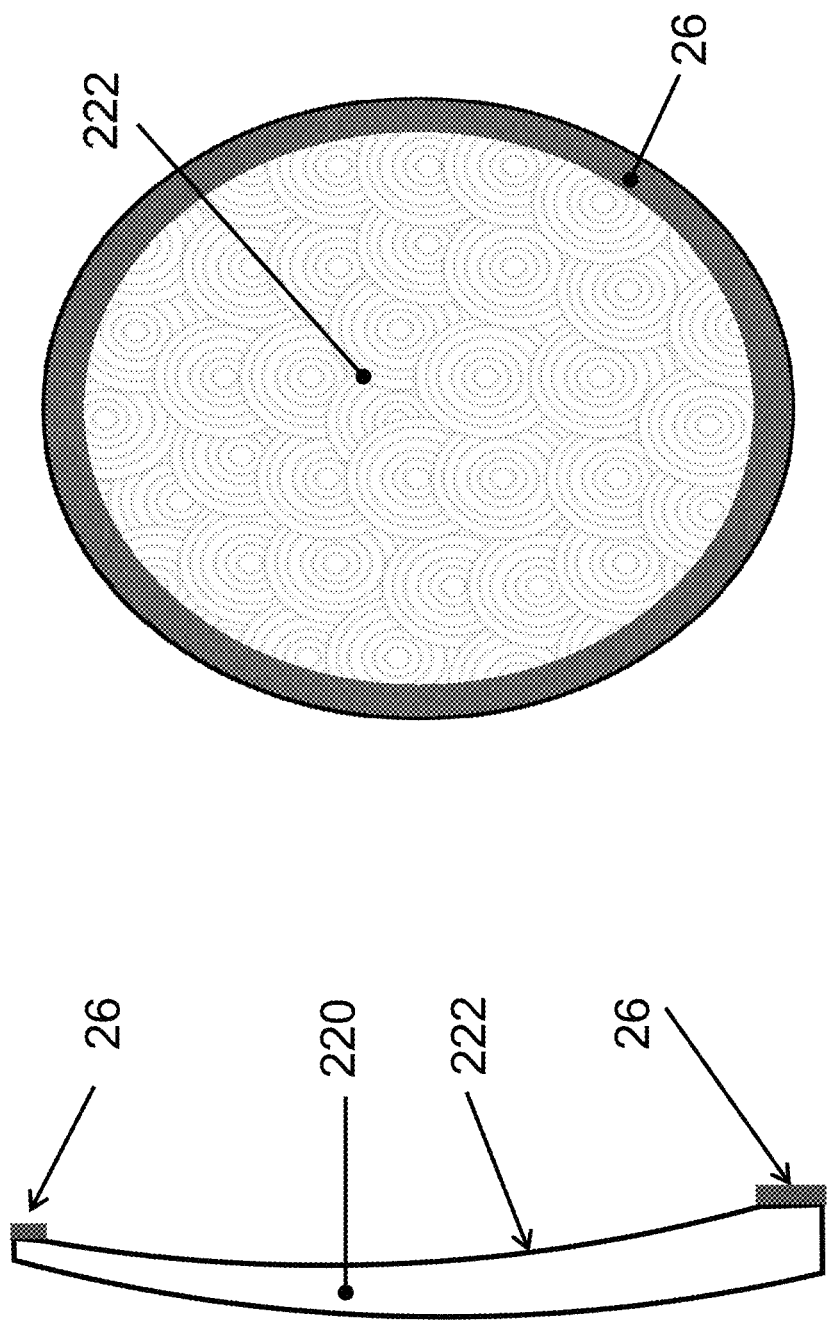

As shown in FIG. 9C, in an embodiment, an outer portion of surface 222 may first be masked with a masking material 26 (e.g., tape or any other suitable material), leaving uncovered a central area on which reflector 250 is to be positioned. Reflective material may then be applied to the uncovered surface portion to form reflector 250 thereon. Coatings of protective materials may optionally be applied on top of reflector 250 to protect the reflective material from being damaged in subsequent steps. For example, a protective material may be applied to protect reflector 250 from reacting with reagents in the monomers and polymers used to form second body section 230. Masking material 26 may then be removed, as shown in FIG. 9D. Referring now to FIG. 9E, a bonding agent 28 may optionally be applied to all or a portion of surface 222 of first body section 220 in preparation for facilitating bonding with second body section 230. Bonding agent 28, in various embodiments, may be applied to exposed portions of surface 222 only, or on both exposed portions of surface 222 and on reflector 250 as shown.

Referring now to FIGS. 9F-9J, in various embodiments, second body section 230 may be formed on and coupled to first body section 220 via a second casting or molding process as described in the context of FIGS. 8I-8M above. In particular, as shown in FIG. 9F, a third mold 30 may be positioned opposite surface 222 of first body section 220. Third mold 30 may be configured with a profile 32 for defining rear surface 204 of second body section 230. Profile 32 may optionally be configured with a curvature for defining a corrective power of lens 200. As configured, surface 222 may act as a profile 32 for defining surface 232 of second body section 230. The resulting cavity 35 between profile 32 and surface 222 or first body section 220 may define a thickness and overall shape of the resulting second body section 230.

Figure 9J:
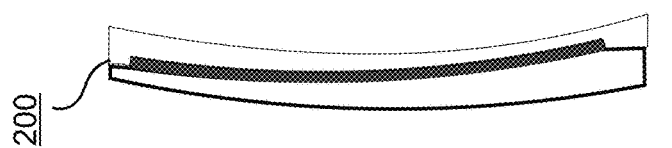
Figure 9I:
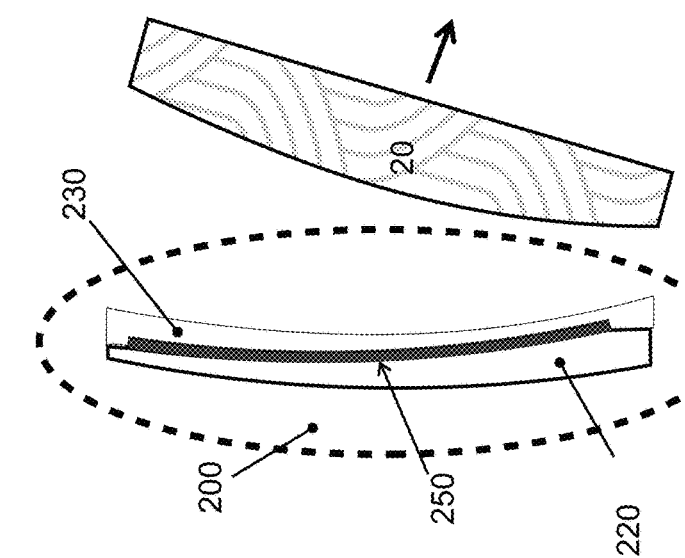
Figure 9H:
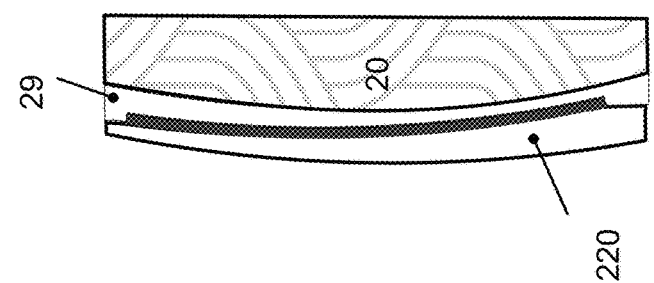

As shown in FIGS. 9G and 9H, cavity 35 may be sealed with a gasket 37 (if necessary), and material 39 for making second body section 230 may be introduced into cavity 35. In various embodiments, material 39 may include any suitable material such as, without limitation, thermal sets, like various acrylates such as CR39, newer materials such as PPG's Trivex, high index plastics produced by Mitsui Chemical Inc. such as MR10, MR7 and others, injection moldable plastics such as polycarbonate. Material 39, in an embodiment, may be injected into cavity 35 using known methods in the art. Material 39 may be chosen to be of substantially similar or substantially different index of refraction to material 29 used to form first lens body 220, depending on the particular application. As previously described, lens 200 may be constructed to redirect image light towards the wearer's eye through any one or combination of refractory index differences and reflector(s) 250.

Once introduced, material 39 may then be cured using any suitable method known in the art such as, without limitation, exposure to heat or ultraviolet light. Of course, curing may include any other method for cross-linking, polymerizing, or changing the phase of the second body section material 230 into a hardened state. Once cured, gasket 37 may be removed (if used) and the resulting lens 200 may be released from third mold 30, as shown in FIGS. 9I and 9J. In this example, second body section 230 has been formed as an additive part on first body section 220, forming an overall integral lens 200. The resulting lens 200 may then be cleaned and de-flashed, if necessary, to remove any fingerprints, flash (e.g., shards of lens material), or other contaminates on its surfaces, and may undergo any other processes in an ophthalmic lab such as surfacing, edging, tinting, etc.

FIGS. 10A-10G depict representative steps for forming an embodiment of lens 200 in which first body section 220 and second body section 230 are separately provided and subsequently coupled, rather than the construction of FIGS. 8A-8M and 9A-9J in which second body section 230 is additively formed on a surface of first body section 220 through casting or molding processes.

Figure 10B:
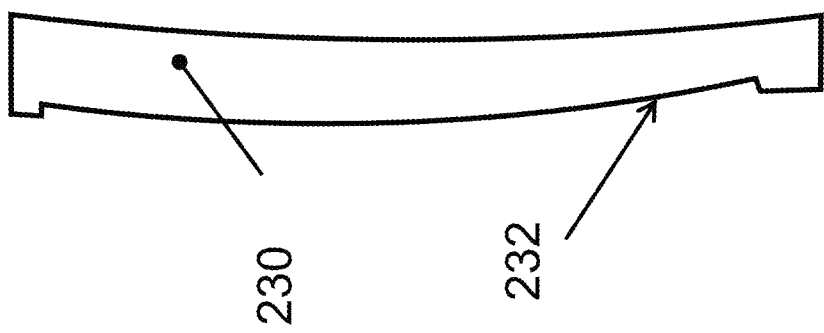
Figure 10A:
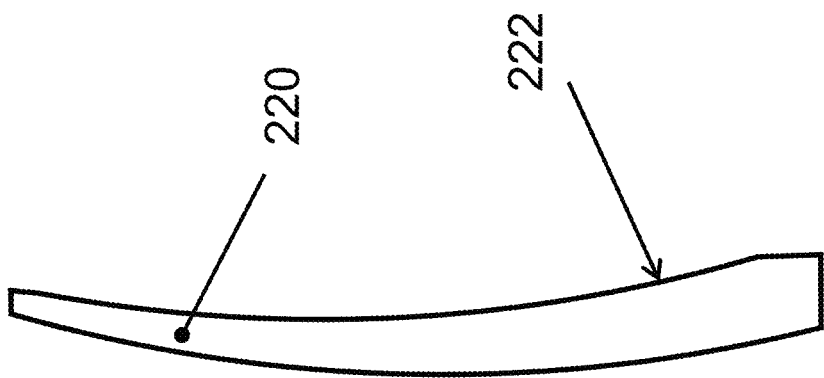

In the present example, first and second body sections 220 and 230 are separately provided, with surface 222 either being machined into or formed during the process of forming the respective body section, as described above. FIG. 10A depicts a representative example of first body section 220 with a concave surface 222, and FIG. 10B depicts a representative of second body section 230. The embodiments shown include curved front and rear surfaces 202, 204 for vision correction.

Referring now to FIGS. 10C-10D, reflector 250 may be applied to surface 222 of first body section 220 in a similar manner as that associated with previous FIGS. 9C-9D. The present example depicts a round-shaped reflector 250 coating a large, central portion of the surface area of concave surface 222 of first body section 220. It should be recognized that this is merely an illustrative example configuration, and that any suitable reflector 250 may be applied to any suitably shaped surface 222 of first body section 220.

Referring now to FIGS. 10E-10G, separately-formed second body section 230 may be coupled to surface 222 of first body section 220 to form lens 200. A bonding agent 28, in various embodiments, may be applied to exposed portions of surface 222 only, or on both exposed portions of surface 222 and on reflector 250 as shown in FIG. 10E.

As shown in FIG. 10G, surface 222 of first body section 220 and surface 232 of second body section 230 may then be aligned and the two sections pressed together to promote adhesion. With reference to FIG. 10H, the bonding agent 28 may then be cured using any suitable method known in the art such as, without limitation, giving it time to dry, or exposing it to heat or ultraviolet light. Of course, curing may include any other method for cross-linking, polymerizing, or changing the phase of the bonding agent 28 into a hardened state and adhering the body sections together along the interface 210 formed by surfaces 222 and 232. Once cured, the resulting lens 200 may then be cleaned and de-flashed, if necessary, to remove any fingerprints, flash (e.g., shards of lens material), or other contaminates on its surfaces, and may undergo any other processes in an ophthalmic lab such as surfacing, edging, tinting, etc.

Common techniques for thinning multifocal lenses, such as prism thinning and any other suitable technique, may also be employed to further improve lens cosmetics.

It should be recognized that, while steps are provided for including a reflector 250 in the above-described exemplary processes for forming lens 200, these steps are optional. Embodiments of lens 200 may be formed without reflector 250 and function as previously described. It should also be recognized that while, in the context of FIGS. 3A-7B, lens 200 was described with second body section 230 being closest to the eye, in the manufacturing examples of FIGS. 8A-10F, either body section 220, 230 could be placed closest to the eye. That is to say, in embodiments where reflector 250 is to be coated onto the body section more distal from the eye (e.g., as shown in FIGS. 5A, 5B, and 6B), second body section 230 is positioned proximate the eye. For clarity, if FIGS. 8M, 9J, and 10F were to be schematic depictions of lens 200 in operation, the eye would be positioned on to the right of lens 200. However, in embodiments where reflector 250 is to be coated onto the body section more proximal to the eye, then first body section 220 is positioned proximate the eye. For clarity, if FIG. 8M, 9J, and 10F were to be schematic depictions of lens 200 in operation, the eye would be positioned to the left of lens 200, and the curvatures of the lens would be reversed.

While the present invention has been described with reference to certain embodiments thereof, it should be understood by those skilled in the art that various changes may be made and equivalents may be substituted without departing from the true spirit and scope of the invention. In addition, many modifications may be made to adapt to a particular situation, indication, material and composition of matter, process step or steps, without departing from the spirit and scope of the present invention. All such modifications are intended to be within the scope of the claims appended hereto.

What is claimed is:

1. A method for manufacturing a lens blank, the method comprising:
   providing a first body section having a first surface and an opposing surface, the opposing surface defining a front surface of the lens blank;
   casting, on the first surface of the first body section, a material for forming a second body section; and
   curing the material to form the second body section and bond it to the first body section to form the lens blank with a unitary body.

2. A method as set forth in claim 1, wherein the first body section is formed of glass, acrylate, urethane, or polycarbonate.

3. A method as set forth in claim 1, wherein the first surface is shaped to manipulate image light in a manner that produces a virtual image in a field of vision of the wearer of a lens formed from the lens blank.

4. A method as set forth in claim 1, wherein the second body section is formed of glass, acrylate, urethane, or polycarbonate.

5. A method as set forth in claim 1, wherein the second body section has substantially the same index of refraction as the first body section.

6. A method as set forth in claim 1, wherein the second body section has a substantially different index of refraction as the first body section.

7. A method as set forth in claim 1, wherein the step of casting includes positioning a mold opposite the first surface of the first body section and introducing, into a cavity between the mold and the first surface of the first body section, a material from which the second body section is formed.

8. A method as set forth in claim 1, wherein the step of curing includes at least one of exposing the material to heat and exposing the material to ultraviolet or other wavelengths of light.

9. A method as set forth in claim 1, further including the step of applying a coupling material on the first surface of the first body section.

10. A method as set forth in claim 9, wherein the coupling material facilitates bonding of the second body section to the first body section.

11. A method as set forth in claim 1, further including the step of coating at least a portion of the first surface with a reflective material.

12. A method as set forth in claim 11, wherein the reflective material includes one of silver, nickel, aluminum, chromium, titanium, various dielectric stack materials including metal oxides, glass or other suitable materials to create a surface which reflect a significant amount of light.

13. A method as set forth in claim 11, wherein the coating of reflective material is transparent or translucent.

14. A method as set forth in claim 11, wherein the step of coating includes coating less than the entirety of the first surface with the reflective material.

15. A method as set forth in claim 11, wherein the reflective surface is shaped to manipulate the image light in a manner that produces a virtual image in a field of vision of the wearer of a lens formed from the lens blank.

16. A method as set forth in claim 11, further including the step of applying a protective material over the reflective material.

17. A method as set forth in claim 16, wherein the protective material protects the reflective coating from reacting with reagents in the material from which the second body section is formed.

18. A method as set forth in claim 11, further including applying a prism thinning technique to one or both of the first and second body sections to reduce a thickness of the lens blank without disturbing the reflective material or interface formed by the coupling of the first and second surfaces.

* * * * *